(12) United States Patent
Zhang et al.

(10) Patent No.: US 9,998,994 B2
(45) Date of Patent: Jun. 12, 2018

(54) LOW POWER REDUNDANT TRANSMISSION NETWORK

(71) Applicant: Squadle, Inc., Cambridge, MA (US)

(72) Inventors: Le Zhang, Allston, MA (US); William K. Chen, Medford, MA (US)

(73) Assignee: Squadle, Inc., Cambridge, MA (US)

( * ) Notice: Subject to any disclaimer, the term of this patent is extended or adjusted under 35 U.S.C. 154(b) by 0 days. days.

(21) Appl. No.: 15/265,611

(22) Filed: Sep. 14, 2016

(65) Prior Publication Data

US 2017/0078965 A1 Mar. 16, 2017

Related U.S. Application Data

(60) Provisional application No. 62/218,206, filed on Sep. 14, 2015.

(51) Int. Cl.
*H04W 52/02* (2009.01)
*H04W 12/04* (2009.01)
(Continued)

(52) U.S. Cl.
CPC ..... *H04W 52/0225* (2013.01); *H04B 7/15528* (2013.01); *H04L 69/18* (2013.01);
(Continued)

(58) Field of Classification Search
CPC .................................................. H04W 12/04
See application file for complete search history.

(56) References Cited

U.S. PATENT DOCUMENTS

| | | |
|---|---|---|
| 6,817,757 B1 | 11/2004 | Wallace |
| 6,856,247 B1 | 2/2005 | Wallace |

(Continued)

FOREIGN PATENT DOCUMENTS

JP 2010074691 4/2010

OTHER PUBLICATIONS

'arubanetworks.com' [online]. "What is "Temporal Diversity" and how is it enabled in controller configuration?" Jun. 30, 2014, [retrieved on Sep. 20, 2016]. Retrieved from the Internet: URL<http://community.arubanetworks.com/t5/Controller-Based-WLANs/What-is-quot-Temporal-Diversity-quot-and-how-is-it-enabled-in/ta-p/176766>. 6 pages.

(Continued)

*Primary Examiner* — Joseph A Bednash
(74) *Attorney, Agent, or Firm* — Fish & Richardson P.C.

(57) ABSTRACT

A method and system for using a communication protocol over a low-powered transmission network. The communication system and protocol enables low-powered transmission devices to efficiently and reliably transmit data in challenging environments. The communication system and protocol can reduce power consumption by designating devices as either transmitter devices, repeater devices, and receiving devices, such that not all devices in the network need to be configured to transmit and receive data. Because the communication protocol does not require that all devices need to both transmit and receive data, there is a significant power usage savings relative to traditional mesh networks. Additionally, the present invention implements a combination of time-based diversity and transmission path diversity to more reliably communicate data. Devices in the system can change the manner in which they operate based on the sensor measurements, allowing the devices to intelligently respond to different conditions.

22 Claims, 9 Drawing Sheets

(51) Int. Cl.
*H04W 84/18* (2009.01)
*H04L 29/06* (2006.01)
*H04B 7/155* (2006.01)

(52) U.S. Cl.
CPC ............ *H04W 12/04* (2013.01); *H04W 84/18* (2013.01); *Y02B 60/50* (2013.01)

(56) References Cited

U.S. PATENT DOCUMENTS

| | | | |
|---|---|---|---|
| 7,026,929 | B1 | 4/2006 | Wallace |
| 7,107,498 | B1 | 9/2006 | Schmidt et al. |
| 7,342,907 | B2 | 3/2008 | Kim et al. |
| 7,436,789 | B2 | 10/2008 | Caliskan et al. |
| 7,483,403 | B2 | 1/2009 | Herrmann et al. |
| 7,649,884 | B1 | 1/2010 | Ahmed et al. |
| 7,719,988 | B1 | 5/2010 | Ruiz et al. |
| 8,442,016 | B1 | 5/2013 | Lee et al. |
| 2002/0077784 | A1* | 6/2002 | Vock .................. A63B 24/0021 702/187 |
| 2004/0230638 | A1 | 11/2004 | Balachandran et al. |
| 2005/0261991 | A1 | 11/2005 | Kennamer |
| 2007/0140494 | A1* | 6/2007 | Kumoluyi ............. H04L 63/105 380/270 |
| 2009/0147714 | A1 | 6/2009 | Jain et al. |
| 2011/0111700 | A1 | 5/2011 | Hackett |
| 2012/0300939 | A1 | 11/2012 | Du et al. |
| 2014/0273858 | A1* | 9/2014 | Panther ................. A61B 5/0002 455/41.2 |
| 2014/0349267 | A1* | 11/2014 | Thornton ............... G09B 23/02 434/276 |
| 2016/0037566 | A1* | 2/2016 | Jakusovszky ......... H04W 8/005 455/41.2 |
| 2016/0157048 | A1* | 6/2016 | Kerai .................... H04W 84/18 455/41.2 |
| 2016/0234022 | A1* | 8/2016 | Motika ................. H04L 9/3213 |

OTHER PUBLICATIONS

'bluvision.com' [online]. "Bluvision to demo cold chain temperature monitoring solution at Passenger Terminal Expo 2016," Mar. 11, 2016, [retrieved on Sep. 20, 2016]. Retrieved from the Internet: URL<http://bluvision.com/bluvision-to-demo-cold-chain-temperature-monitoring-solution-at-passenger-terminal-expo-2016/>. 3 pages.

'kontakt.io' [online]. "Adding Sensors to Beacons is Easy, Not Impressive. Here's Why," Jun. 2014, [retrieved on Sep. 20, 2016]. Retrieved from the Internet: URL<https://kontakt.io/blog/adding-sensors-beacons-easy-impressive-heres/>. 6 pages.

'mkompf.com' [online blog]. "Eddystone TLM," 2016, [retrieved on Sep. 20, 2016]. Retrieved from the Internet: URL<https://www.mkompf.com/tech/eddystonetlm.html>. 3 pages.

'nfcworld.com' [online]. "Google introduces Eddystone, a new open format for BLE beacons," Jul. 15, 2015, [retrieved on Sep. 20, 2016]. Retrieved from the Internet: URL<http://www.nfcworld.com/2015/07/15/336661/google-introduces-eddystone-a-new-open-format-for-ble-beacons/>. 4 pages.

'wikipedia.org' [online]. "Derived unique key per transaction," Jun. 29, 2016, [retrieved on Sep. 20, 2016]. Retrieved from the Internet: URL<https://en.wikipedia.org/wiki/Derived_unique_key_per_transaction>. 6 pages.

'wikipedia.org' [online]. "Exponential backoff," Aug. 23, 2016, [retrieved on Sep. 20, 2016]. Retrieved from the Internet: URL<https://en.wikipedia.org/wiki/Exponential_backoff>. 3 pages.

'wikipedia.org' [online]. "Finite-state machine," Sep. 12, 2016, [retrieved on Sep. 20, 2016]. Retrieved from the Internet: URL<https://en.wikipedia.org/wiki/Finite-state_machine>. 10 pages.

'wikipedia.org' [online]. "Fire alarm system," Sep. 11, 2016, [retrieved on Sep. 20, 2016]. Retrieved from the Internet: URL<https://en.wikipedia.org/wiki/Fire_alarm_system>. 9 pages.

'wikipedia.org' [online]. "Salt (cryptography)," Sep. 2, 2016, [retrieved on Sep. 20, 2016]. Retrieved from the Internet: URL<https://en.wikipedia.org/wiki/Salt_(cryptography)>. 3 pages.

'wikipedia.org' [online]. "Wireless sensor network," Sep. 7, 2016, [retrieved on Sep. 20, 2016]. Retrieved from the Internet: URL<https://en.wikipedia.org/wiki/Wireless_sensor_network>. 9 pages.

Abolhasan et al., "A Routing Strategy for Heterogeneous Mobile Ad Hoc Networks," IEEE 6th CAS Symp. on Emerging Technologies: Mobile and Wireless Comm., University of Wollongon Australia, 2004, 6 pages.

Dousse et al., "Impact of Interferences on Connectivity in Ad Hoc Networks," IEEE/ACM Trans. on Networking, Feb. 2005, 13(2):425-436.

Hourani, "An Overview of Diversity Techniques in Wireless Communication Systems," Helsinki University of Technology, S-72.333 Postgraduate Course in Radio Communications (2004/2005), 5 pages.

Kashyap et al., "Survey on Unicast Routing in Mobile Ad Hoc Networks," University of Texas at Dallas, Computer Science Department, Nov. 12, 2001, 26 pages.

Nesargi and Prakash, "A Tunneling Approach to Routing with Unidirectional Links in Mobile Ad-Hoc Networks," University of Texas at Dallas, Department of Computer Science, 2000, 6 pages.

'wikipedia.org' [online]. "User Datagram Protocol," Jan. 14, 2016, [retrieved on Jun. 13, 2017]. Retrieved from the Internet: URL<https://en.wikipedia.org/w/index.php?title=User_Datagram_Protocol&oldid=699803997>. 6 pages.

\* cited by examiner

LOW POWER REDUNDANT TRANSMISSION NETWORK

CROSS-REFERENCE TO RELATED APPLICATION

This application claims priority from and the benefit of U.S. Provisional Patent Application No. 62/218,206, filed Sep. 14, 2015, the entire contents of which is incorporated by reference herein.

TECHNICAL FIELD

This document relates to a low-powered redundant transmission network suitable for enabling robust transmission of data from a source to a destination in challenging environments. In particular, the present invention relates to a low-powered redundant transmission network capable of utilizing time-based redundancies and transmission path diversity to reliably transmit data over a network of low-powered node devices.

BACKGROUND

Generally, communication protocols are used to define rules to enable two or more communication devices to transmit information between one another. The communication protocols can include rules for dictating how data is formatted for data transmissions, address formats for data transmission, address mapping, routing, detection of transmission errors, acknowledgements, loss of information, direction of information for flow, sequence of control, flow control, etc. Each communication protocol is standardized to be used in the same manner over a variety of enabled communication devices in a communication system. Similarly, the devices in a communication network can agree upon a particular communication protocol to use for communications over the network. Some traditional network protocols include Transmission Control Protocol (TCP), File Transfer Protocol (FTP), SMTP, Hyper Text Transfer Protocol (HTTP), Post Office Protocol (POP), Point to Point Protocol (PPP), Bluetooth low energy (BLE) etc. These communication protocols can be used to create a network and to transmit data between devices on the network in a standardized format. As the number of devices within communication systems grows, there is a need to use communication protocols to organize network topologies to reliably transmit data between a source node and a destination node while passing the data between a number of intermediary nodes. In particular, logical network topologies are determined by network communication protocols and are designed to reliably and efficiently transmit data between a source and a destination nodes over a communication system of devices when the source and destination devices are not capable of communicating directly with one another (e.g., out of range for wireless communications, not sharing a direct wired connection, etc.).

One example of a conventional network topology is a mesh network. In a mesh network, all mesh nodes cooperate in the distribution of data in the network using a combination of a flooding technique or a routing technique. However, this methodology experiences some shortcomings. A mesh network is implemented such that each node needs to be configured to send and receive data. Having each node configured to send and receive data requires each device to have a consistent power source due to high power usage. Power usage is greater for reception than transmission because to receive data, the node has to be constantly listening for data transmissions and then receive those transmissions. The larger the number of nodes in the network, the greater the power demand for the overall communication system. Accordingly, there is a need for a robust, low-power transmission of data from a source to a destination in challenging environments.

SUMMARY

There is a need for a communications system that enables low-powered transmission devices to efficiently and reliably transmit data in challenging environments. The present invention is directed to further solutions to address this need, in addition to having other desirable characteristics. Specifically, the present invention provides a communication system with a communication protocol to enable the communication system to utilize the devices in a unique configuration that provides redundancy and reduced power consumption. The communication system enables the devices to communicate without pairing and on their own timelines without needing to broadcast over a mesh network. The communication system can use low energy devices that only need to communicate data over short distances by using available nodes, e.g., devices, between the source device and a destination device to act as repeaters for the data transmission. The communication system can reduce power consumption by designating devices as either transmitter devices, repeater devices, and receiving devices, such that not all devices in the network need to be configured to transmit and receive data. Because the communication system does not require that all devices need to both transmit and receive data, there is a significant power usage savings relative to traditional mesh networks. Additionally, communication system of the present invention implements a combination of time-based diversity and transmission path diversity to more reliably communicate data across the communication system.

In accordance with an embodiment of the present invention, a low-powered redundant transmission network system implementing a communication protocol to manage data transmissions is provided. The system includes at least one transmitter device. The at least one transmitter device is configured to determine a rate of obtaining data from a data collection device, obtain data from the data collection device at intervals associated with the rate of obtaining the data from the data collection device, transform the obtained data into a unique payload in a data packet, identify available communication technologies available through a transmitter of the at least one transmitter device, modify the data packet based on the identified available communication technologies, determine a rate of broadcast and duration of broadcast for the data packet, and simultaneously broadcast iterations of the data packet at intervals associated with the rate of broadcast over the available communication technologies until the duration of broadcast is satisfied. The unique payload of the data packet is updated at each iteration with a unique ordered designator.

In some implementations, the system includes at least one repeater device. The at least one repeater device is configured to receive and optionally cache the data packet from the at least one transmitter device or another repeater device, determine whether the data packet includes an indicator that the data packet has been previously received by the at least one repeater device, determine a rate of rebroadcasting the data packet from the unique payload in the data packet, modify the payload to indicate that the data packet has been received by the at least one repeater device, and at least one of rebroadcast the data packet, de-duplicate the data packet, and duplicate the data packet based on the determination whether the data packet includes an indicator that the data packet has been previously received by the at least one repeater device and the determined rate of rebroadcasting the data packet.

In some implementations, the system includes at least one receiver device. The at least one receiver device is configured to receive and optionally cache the data packet from the at least one transmitter device and/or the at least one repeater device and at least one of de-duplicate the transmittable data packet, and transform the data packet into readable data of the obtained data from the data collection device.

In some implementations, the transmitter of the at least one transmitter device, the at least one repeater device, and the at least one receiver device are low-powered devices configured to communicate over wireless signals, wired signals, or both. In some implementations, the at least one repeater device selectively rebroadcasts the transmittable data packet using algorithms to increase transmission viability. In some implementations, the algorithms comprise an exponential backoff. In some implementations, the at least one transmitter device and the at least one repeater device simultaneously broadcast the data packet to all repeater devices and receiver devices within range.

In some implementations, the unique ordered designator for each iteration comprises an offset time from a time that the obtained data was originally obtained from the data collection device. In some implementations, the at least one repeater device identifies a number of hops that the transmittable data packet has been transmitted over other repeater devices. In some implementations, the at least one transmitter device periodically self-activates for broadcasting data packets for a predetermined period of time and subsequently enters a sleep mode. In some implementations, the data packet is broadcast by the at least one transmitter device at an interval greater than a rate that the obtained data is obtained from the data collection device. In some implementations, the data packet is rebroadcast by the at least one repeater device at an interval greater than the rate of broadcast of the at least one transmitter device.

In some implementations, the transmittable data packet broadcast by the at least one transmitter further comprises original collected data, a timestamp for the original collected data, a timestamp for the data packet broadcast, and metadata identifying the data collection device. In some implementations, each unique payload includes a unique key for each unique set of obtained data from the data collection device. In some implementations, the unique key can be combined with a unique identifier for the at least one transmitter device specific to that particular transmitter device.

A method of managing data transmissions includes determining a rate of obtaining data from a data collection device, obtaining data from the data collection device at intervals associated with the rate of obtaining the data from the data collection device, transforming the obtained data into a unique payload in a data packet, identifying available communication technologies available through a transmitter of the at least one transmitter device, modifying the data packet based on the identified available communication technologies, determining a rate of broadcast and duration of broadcast for the data packet, and simultaneously broadcasting iterations of the data packet at intervals associated with the rate of broadcast over the available communication technologies until the duration of broadcast is satisfied. The method can further include wherein the unique payload of the data packet is updated at each iteration with a unique ordered designator.

The method of managing data transmissions applies to many systems, such as those systems that automatically monitor the temperature of food delivered by distributors such as National DCP, Sysco, and USFoods, and those systems that monitor back-of-house equipment and food temperatures at restaurants such as Burger King, Chick-fil-A, McDonald's, Pizza Hut, Sonic Drive-In, Starbucks, Subway, Taco Bell, and Wendy's. Such systems would use temperature sensors that are available from many vendors including Cooltrax, Digi, Kelsius, Kroger, Monika, Monnit, Orbcomm, PAR Technologies, Sensitech, and TempAlert.

BRIEF DESCRIPTION OF THE DRAWINGS

These and other characteristics of the present invention will be more fully understood by reference to the following detailed description in conjunction with the attached drawings.

DETAILED DESCRIPTION

Figure 1A:
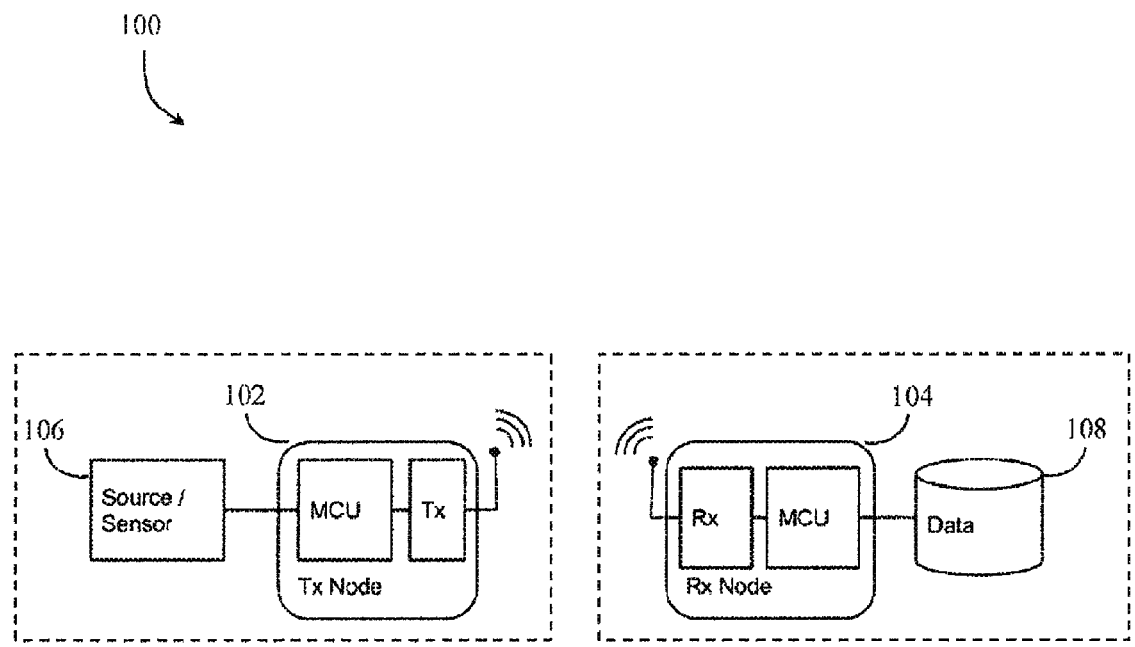
FIGS. 1A and 1B are an illustrative environments for implementing the steps in accordance with the aspects of the invention.

An illustrative embodiment of the present invention relates to a system implementing a robust power efficient unidirectional communication protocol. The communication system and protocol implements a low-powered redundant transmission network suitable for enabling robust transmission of data from a source to a destination in challenging environments. In particular, the present invention relates to a low-powered redundant transmission network capable of utilizing time-based redundancies and transmission path diversity to reliably transmit data over a network of low-powered node devices. The communication system reduces power consumption by designating devices as one of a transmitter, repeater, or receiver and optimizing each device to conserve power while providing transmission redundancies for reliability. The communication protocol provides a standardized transmission format to be used by each of the transmitter, repeater, and/or receiving devices. Using the communication protocol, the transmission and reception functionalities for each of the devices can be optimized based on their respective designations. In particular, devices designated as transmitter devices are only responsible for the transmission of data and not receiving data. Accordingly, transmission hardware for transmitter devices needs only to be powered on during transmission periods and can be placed into a sleep mode or off-state during other periods to conserve energy. Devices designated as repeater devices are responsible for both the reception of data and the transmission of received data. Devices designated as receiver devices are only responsible for receiving data transmission. Each of the devices can be low-powered devices (e.g., battery-powered devices) and can operate on their own timelines (e.g., independently and asynchronously). As would be appreciated by one skilled in the art, the present invention can also be implemented on a high power network or a network utilizing a combination of low power and high power devices.

The transmitter devices are responsible for obtaining data from one or more data collection devices, transforming the obtained data into a unique data payload to be transmitted in a data packet to available repeater devices and/or receiver devices. Each unique data packet can be transmitted by the transmitter devices according to rules implemented by the communication protocol of the system of the present invention. The communication system, using the communication protocol, can designate the format of the unique payload, the data packet, transmission pathways, and the transmission rate of the data packet to provide both time-based diversity and transmission path diversity for the transmitted data. To provide time-based diversity, the communication protocol can dictate how many iterations of each data packet for the transmitter device to transmit and the frequency of those transmissions. To provide transmission path diversity, the communication protocol can dictate which communication pathways are available over various transmission mediums (e.g., Bluetooth® protocol, Wi-Fi® protocol, wired network, etc.) and also dictate which pathways to transmit the data packets. The communication protocol can optionally designate devices to transmit data simultaneously over multiple different transmission mediums.

Additionally, the communication protocol can designate how the system should format the data packets for each for each of the transmission mediums. The combination of the time-based diversity and the transmission path diversity create a redundant transmission network for the data packets.

Similarly, the communication system implementing the communication protocol can designate how received data packets are handled by the repeater devices and/or the receiver devices. Each receiving device can cache the data packets and either de-duplicate the data packets by removing duplicate transmissions or increase the time-based diversity of the data packets by making duplicate copies and transmitting the duplicate copies. The repeaters can selectively rebroadcast the data packets and/or broadcast duplicates based on information included in the unique payload of each data packet and the rules in the communication protocol. The rate of the rebroadcasts can be static, can be variable based on a predetermined algorithm, or can variable based upon external inputs that may change over time. Additionally, each repeater can have a unique rebroadcast rate or algorithm associated with that repeater. Additionally, the system implementing the communication protocol can dictate which communication pathways are available over various transmission mediums and which pathways for the repeater devices to transmit the data packets.

FIGS. 1A through 6, wherein like parts are designated by like reference numerals throughout, illustrate an example embodiment or embodiments of a communication system implementing the communication protocol, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed in a manner still in keeping with the spirit and scope of the present invention.

Figure 1B:
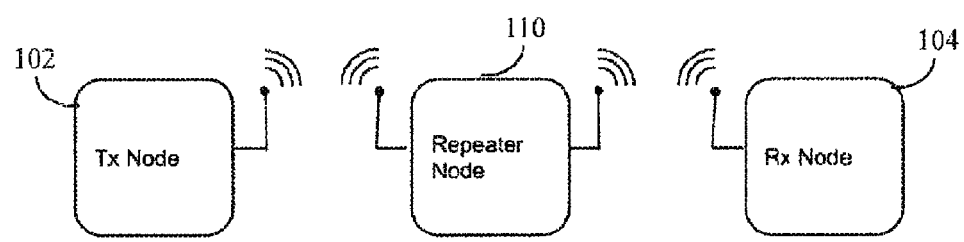

FIGS. 1A and 1B depict illustrative environments for implementing the communication protocol in accordance with the aspects of the invention. Specifically, FIG. 1A depicts an exemplary environment including a transmitter device and a receiver device. FIG. 1B depicts an exemplary system including a transmitter device, a repeater device, and a receiver device and their respective transmission/receiving configurations. As would be appreciated by one skilled in the art, the communication systems 100 can include any combination of transmitter devices, receiver devices, and repeater devices and can be constantly changing based on the availability of devices on the network. For example, there can be instances in which there are no receiving devices and no repeater devices available on a communication system at a given time period and instances in which all the types of devices are available on the same communication system at a different time period.

Beginning with FIG. 1A, the communication system 100 can include a transmitter device 102 and a receiver device 104. The transmitter device 102, alone or together with the sensor 106, can be considered a sensor device, as it receives, processes, and transmits sensor data. Any appropriate device for collecting sensor data from one or more sensors can be designated as a transmitter device 102 in the network. The transmitter device can be placed in a transmit-only mode to conserve battery power, as discussed herein. As would be appreciated by one skilled in the art, the transmitter device 102 and the receiver device 104 can include any combination of computing devices that are configured to send and/or receive data. The computing devices can be general purpose computers specifically configured to implement the system described herein, or a specialized computer system. For example, the transmitter device 102 and the receiver device 104 can include single computing devices, a collection of computing devices in a network computing system, a cloud computing infrastructure, or a combination thereof: as would be appreciated by those of skill in the art. As would be appreciated by one skilled in the art, the communication system 100 can include one or more transmitter devices 102 and one or more receiver devices 104. In accordance with an example embodiment of the present invention, the transmitter device 102 and receiver device 104 can be specifically designed computing devices for implementing the communication protocol of the present invention.

Each transmitter device 102 can include at least a microcontroller (MCU) and a transmitter for transmitting (Tx) data transmissions. As would be appreciated by one skilled in the art, the transmitter can include any combination or hardware and software configured to transmit data from a source. For example, the transmitter can be an antenna configured to communicate wirelessly (e.g., for communicating over a Bluetooth low energy (BLE) signal, Wi-Fi, etc.) or can be an Ethernet port (e.g., for communicating over LAN, WAN, etc.).

Similarly, each receiver device 104 can include at least a microcontroller (MCU) and an antenna and/or port for receiving such communication mediums. In accordance with an example embodiment of the present invention, the transmitter device 102 can include or otherwise be in communication with a sensor 106. The sensor 106 can include any data collection source and/or sensor that is configured to obtain data and/or take measurements. For example, the sensor 106 can be a temperature sensor configured to take temperature readings. The transmitter device 102 can be configured to periodically receive and/or obtain data from the sensor 106. In accordance with an example embodiment of the present invention, the transmitter device can request data from the sensor 106 at a predetermined interval based on the particular sensor 106 from which the data is being requested. For example, the transmitter device 102 can request a temperature reading from sensor 106 in a freezer every 5 minutes and can request a temperature reading from sensor 106 in a deep fryer every 30 seconds. As would be appreciated by one skilled in the art, the transmitter device 102 can include or otherwise be in communication with a single sensor 106 or a plurality of sensors 106.

Continuing with FIG. 1A and in accordance with an example embodiment of the present invention, the receiver device 104 can include or otherwise be in communication with a data storage device 108 to store data transmissions received from the transmitter device 102. As would be appreciated by one of skill in the art, the data storage device 108 can include any combination of computing devices configured to store and organize a collection of data. For example, the data storage device 108 can be a local storage device on the receiver device 104, a remote database facility, or a cloud computing storage environment. The data storage device 108 may also include a database management system utilizing a given database model configured to interact with a user for analyzing the database data. In accordance with an example embodiment of the present invention, the receiver device 104 can represent a gateway device which can further communicate the received data transmissions to a cloud computing system and database for later retrieval.

FIG. 1B depicts an example embodiment of the communication system 100. The communication system 100 in FIG. 1B includes a transmitter device 102 and a receiver device 104, as discussed with respect to FIG. 1A. Additionally, the communication system 100 in FIG. 1B includes a repeater node or repeater device 110. In accordance with an example embodiment of the present invention, the repeater device 110 is configured to both receive and transmit data transmissions. For example, the repeater device 110 can receive data from the transmitter device 102 and re-transmit the data to the receiver device 104. In accordance with an example embodiment of the present invention, there can be multiple repeater devices 110 and each repeater device 110 can be configured to receive and transmit data transmissions between the transmitter device 103, the receiver device 104, and other repeater devices 110. As would be appreciated by one skilled in the art, the repeater devices 110 can use same the hardware configuration as transmitter devices 102 and the receiver devices 104, but have firmware enabling the repeater devices 110 to be configured to both receive and transmit/retransmit the data transmissions. Since the repeater devices 110 are configured to transmit and receive, they need a constant supply of power, accordingly the repeater devices 110 can be placed in strategic locations for consistent power supply (e.g., plugged into a wall, or have a battery). In accordance with an example embodiment of the present invention, the repeater device 110 can selectively rebroadcast the data packets and/or broadcast duplicates based on information included in the data transmission and the rules in the communication protocol, as discussed in greater detail below.

The transmitter device 102, the receiver device 104, and the repeater device 110 are each configured to operate under the standardized communication protocol in accordance with the present invention. For example, the standardized communication protocol can be installed on the transmitter device 102, the receiver device 104, and the repeater device 110 through a combination of software and/or firmware. The standardized communication protocol provides a standardized transmission format to be used by the transmitter device 102, the receiver device 104, and the repeater device 110 within the communication system 100. The communication protocol enables devices in communication with the communication system 100 to create a reliable data transmission network while reducing the overall power consumption of the system.

As would be appreciated by one skilled in the art, the communication protocol can be implemented on top of different types of nodes and/or transmission mediums, including Bluetooth®, Bluetooth® Low Energy (BLE), Wi-Fi®, Ethernet, Serial, RS-485, Websocket, etc. In accordance with an example embodiment of the present invention, the transmitter device 102 can transmit the data packet over different pathways for using different types of transmission mediums. For example, if the hardware for the transmitter device 102 is configured to transmit data over Wi-Fi® and BLE, then the transmitter device 102 can simultaneously send data transmissions over both mediums for each unique set of obtained data. As would be appreciated by one skilled in the art, the communication protocol can be designed to format data packets specifically for each transmission medium. For example, transmitting a data packet over Wi-Fi-TCP a destination address would need to be included in the data packet, while a transmission over BLE would not require a destination address. The availability for each transmitter device 102, and subsequent transmitting devices (e.g., repeater devices 110) creates transmission path diversity in case one or more transmission paths lead to lost data transmissions.

In operation, the communication system 100, as depicted in FIGS. 1A and 1B, utilizes the communication protocol to implement a low energy, and reliable data transmission network. As utilized herein, "low energy" refers to technology that is implemented using relatively lower power consumption than similar other devices. For example, BLE is said to have 10 to 100 times lower power consumption than traditional Bluetooth® technology.

Devices that are "low energy" are optimized for low energy consumption versus transmission power, processing speed, data transmission bandwidth and quantity, and the like, as would be readily appreciated by those of skill in the art. As would also be appreciated by one skilled in the art, the communication protocol of the present invention can also be implemented in a high powered network or a combination of nodes that are high-powered and low-powered while providing the same benefits in reliability and power consumption. However, it is not the case that communication protocols of high powered networks or node combinations in all instances could be implemented in accordance with the low energy parameters of the present invention. Initially, operation of the communication system 100 starts with the transmitter device 102 obtaining data from the sensor 106. For example, the transmitter device 102 can include or otherwise communicate with a temperature sensor 106 for obtaining a temperature of a given space and/or item. Once the transmitter device 102 has obtained the data from the sensor 106, the transmitter device 102 can follow the communication protocol to transform the data into a unique data payload for transmission within a data packet to a source device (e.g., a receiver device 104).

In accordance with an example embodiment, of the present invention, the transmitter devices 102 only need to be configured to transmit data, so transmitter devices 102 can turn on their radios (if wireless) for a short time (e.g., put the radios to sleep) and when the transmitter devices 102 want to transmit a data packet they can wake up the radios for data transmission.

The transmitter device 102 can format the payload according to the communication protocol to include the obtained data along with information defined in the rules of the communication protocol of the present invention. As would be appreciated by one skilled in the art, the data packets can include a single measured value, a collection of measured values from a single sensor 106 over a period of time, a collection of measured values from multiple sensors 106, or a combination thereof. In accordance with an example embodiment of the present invention, the rules of the communication protocol can require the payload include the obtained data, a timestamp for the obtained data (e.g., a time at which a temperature reading was taken by the temperature sensor), a timestamp for the transmission, metadata identifying the transmitter device 102 and/or the sensor 106, a firmware version, a sensor type, and battery voltage of the transmitting device. The metadata can enable a receiving node (e.g., a repeater device 110 or receiver device 104) to determine whether multiple data transmissions received from multiple different pathways (e.g., one over Wi-Fi® and one over BLE) include duplicate payloads for the same obtained data from a same transmitter device 102. As would be appreciated by one skilled in the art, the metadata can include any format in which would allow another device within the communication system 100 to identify the payload a unique set of obtained data from a particular source transmitter device 102. For example, the metadata can include a unique key for each unique set of obtained data from the sensor 106, such as a randomly assigned unique identifier associated with a source transmitter device 102, a media access control (MAC) address for the transmitter device 102, or a combination thereof, etc.

After obtaining the data from the sensor 106 and formatting the payload and data packet including the obtained data, the transmitter device 102 can periodically broadcast redundant data packets including the obtained data in intervals. As would be appreciated by one skilled in the art, depending on the communication medium format (e.g., Wi-Fi®, BLE, wired, etc.) the broadcasts can be transmitted in the form of broadcast advertisements to be received by listening receiving devices (e.g., repeater devices 110 and/or receiver devices 104). For example, the transmitter devices 102 can wirelessly broadcast BLE broadcast advertisements to be received by devices capable of reading over air BLE advertisements. In accordance with an example embodiment, the data packets for a given set of obtained data (e.g., a particular temperature reading from a particular time from a temperature sensor) can be broadcast from the transmitter device 102 at a greater frequency than the frequency in which the data is collected (e.g., frequency that the sensor 106 takes temperature readings), to take advantage of time-based diversity. For example, a temperature sensor (sensor 106) can capture temperature data every five minutes, and the transmitter device 102 can broadcast the captured temperature data once every second. In accordance with an example embodiment of the present invention, a rate of obtaining data from the sensor 106 can be a fraction of the rate of the transmitter device 102 broadcasting that obtained data. As would be appreciated by one skilled in the art, the interval that the transmitter devices 102 transmit the data packets can be established and/or modified by other factors. For example, the intervals can set or adjusted based on a predetermined value, a user input value, based on a current battery level of a transmitter device 102 (e.g., a low battery transmitting at greater intervals), an anticipated degradation of the data transmission based on the transmission medium, based on anticipated interference, etc.

Similarly, the transmitter devices 102 can modify a rate of transmission of the data packets based on the obtained data from the sensor 106. For example, if the obtained data from a sensor 106 in a refrigerator indicates a temperature above a desired threshold (e.g., a temperature greater than 41 degrees), then an error condition can be triggered that modifies the rate of transmission to be multiplied above the normal rate of transmission. As would be appreciated by one skilled in the art, modification to a rate of broadcast can be dictated by rules established in the communication protocol. In accordance with an example embodiment, the communication protocol can include rules for various criteria that trigger changing a rate of broadcast for a particular set of obtained data. These criteria can include an operating status (e.g., battery life, on/off state, etc.) of the devices within the transmission network (e.g., the transmitter device 102 or sensors 106), error conditions based on the obtained data (e.g., the obtained data exceeding or failing to meet a desired threshold), and/or other predetermined criteria. Based on the criteria established in the rules of the communication protocol, when an event occurs that matches one or more of the criteria, the rate of transmission can be modified accordingly (e.g., increased or decreased by a predetermined amount). As would be appreciated by one skilled in the art, the rate of rebroadcast by the repeater devices 110 can also be modified in the same manner, as discussed in greater detail below.

In accordance with an example embodiment of the present invention, the current iteration of the data transmission at a given interval can be identified in the payload using a unique ordered designator. For example, each time that a particular obtained data set is re-transmitted from the particular transmitter device 102, the unique ordered designator in the payload is updated to reflect which iteration of the data transmission that data packet belongs to within the data transmission broadcast. As would be appreciated by one skilled in the art, the unique ordered designator can include a counter, an offset time from a time in which the original data was obtained from the sensor 106, setting a flag, etc. As would be appreciated by one skilled in the art, the communication protocol can also include additional rules and formatting within the payload and/or data packet traditionally used in other standardized protocols. For example, the communication protocol can include rules for providing error codes identifying the error, source of an error, etc. In accordance with an example embodiment, the payload of the data transmissions can be end to end encrypted (e.g., via Advanced Encryption Standard (AES) or RSA).

As the data packets are broadcast, any available devices within range of the broadcast can be listening for broadcasts and/or receive the data transmission. As would be appreciated by one skilled in the art, both receiver devices 104 and repeater devices 110 can be configured to receive any data transmissions broadcast from the transmitter devices 102 within range. In accordance with an example embodiment of the present invention, each device capable of receiving data transmissions can cache the transmitted data and either de-duplicates the data transmission by removing duplicates, or increase the time redundancy by making multiple copies of the data transmission and broadcasting the duplicates. The devices receiving the data transmission (e.g., receiver devices 104 and repeater devices 110) determine whether or not the data transmission should be de-duplicated, based on the communication protocol. For example, if the receiver device 104 has already received a data transmission including the same unique payload (e.g., the same set of obtained data from the same transmitter device 102), then the subsequently received data packets including that unique payload can be ignored and/or discarded. The time-based diversity created by redundant duplicates is used to create reliable data transmission in difficult environments that have time-based disturbances in data signal transmission. As would be appreciated by one skilled in the art, duplicate data transmissions provide time-based redundancy when data transmissions are interfered with due to bursts of energy, electromagnetics, and/or other signals (e.g., microwave, video senders, other wireless networks, etc.) from other sources that can cause signal degradation of data transmissions during those bursts. Similarly, the redundancy allows the duplicate data transmissions to overcome non-time-based signal degradation such as concrete walls, stainless steel appliances, etc.

In accordance with an example embodiment of the present invention, the repeater devices 110 can selectively duplicate rebroadcast data using different algorithms, effectively extending a range of broadcast for the transmitter device 102 that originated the data transmission. As would be appreciated by one skilled in the art, the different algorithms can range from a simple "1 to 1" in and out transmission type algorithm (e.g., each received data transmission is subsequently rebroadcast 1:1) to complicated exponential backoff algorithms. For example, in an exponential back off algorithm, when a data packet is received, duplicate copies of the data packet can be rebroadcast at an interval of t seconds, 2*t seconds, 4*t seconds, 8*t seconds, up to a predefined number of rebroadcasts. This can be written as k/\n*t, where n goes from 1 to N. In accordance with an example embodiment of the present invention, to prevent a data transmission passing through a repeater device 110 an excessive number of times and/or causing infinite loops (e.g., in a 1 to 1 type algorithm), the data packet can be modified by the repeater device 110 to include an indication of which repeater devices 110 that the data transmission has been through or an indicator to limit the number of hops that the data transmission has traveled over.

In accordance with an example embodiment of the present invention, the modification of the data packet can include an indication that the received data transmission has been received by and rebroadcast by a particular repeater device 110 or number of times the data transmission has been rebroadcasts by repeater devices 110. Similarly, the repeater devices 110 can be used in groups, and data in the payload of re-broadcast data packets can be modified to reflect the group of repeater devices 110, as opposed to an individual repeater device 110. In accordance with an example embodiment of the present invention, when duplicating the data packets, the repeater devices 110 can modify the payload to indicate how much time has passed since the original data transmission. For example, a timing field can be changed based on an amount of time, if any, since the original data transmission was transmitted by the transmitter device 102.

In accordance with an example embodiment of the present invention, the repeater devices 110 can bridge one communication medium to another, and it can cache transmissions for later broadcasts. For example, if the repeater device 110 receives a data transmission over Wi-Fi® and is configured to transmit over Wi-Fi® and BLE, then the repeater device 110 can modify the packet if necessary and subsequently re-broadcast the data transmission over both available mediums to provide transmission path redundancy.

Continuing with the operation of FIGS. 1A and 1B, the data transmission can be stored once the data transmission hops through any amount of repeater devices 110 on the way from the source transmitter device 102 to the destination receiver device 104. The receiver devices 104 can be the devices that store the data transmission for additional processing or can be intermediary devices between a larger data storage system. For example, receiver devices 104 can act as a gateway to a cloud computing environment and use the internet to communicate the received data transmissions to the cloud computing environment. As would be appreciated by one skilled in the art, the receiver device 104 can receive data transmissions from the transmitter devices 102 and/or the repeater devices 110. When a data packet has been received by the receiver device 104, the receiver device 104 can make a determination whether or not the data transmission includes duplicate information from a data transmission that has already been received (e.g., the same unique payload). As would be appreciated by one skilled in the art, the receiver device 104 can determine that a data transmission is a duplication by comparing the payload and the unique identifying information within the payloads. For example, the receiver device 104 can compare an identifier for a source of the obtained data and a timestamp for the obtained data to determine whether the data is from the same source at the same time as previously received data.

The receiver device 104 can de-duplicate received data packets by ignoring data transmissions that are determined to be duplicates. In accordance with an example embodiment of the present invention, receiver devices 104 can also ignore data packets that are not addressed to that particular receiver device 104 or are not originating from a particular sensor 106, such that data packets from sensors 106 that are not applicable to the functionality of the receiver devices 104 can be dropped. For example, a receiver device 104 designed to collect temperature data from a number of temperature sensors 106 will ignore data packets non-temperature sensors 106. As would be appreciated by one skilled in the art, repeater devices 110 can similarly be configured to ignore data packets received from certain sensors 106 and not rebroadcast those packets.

Figure 2:
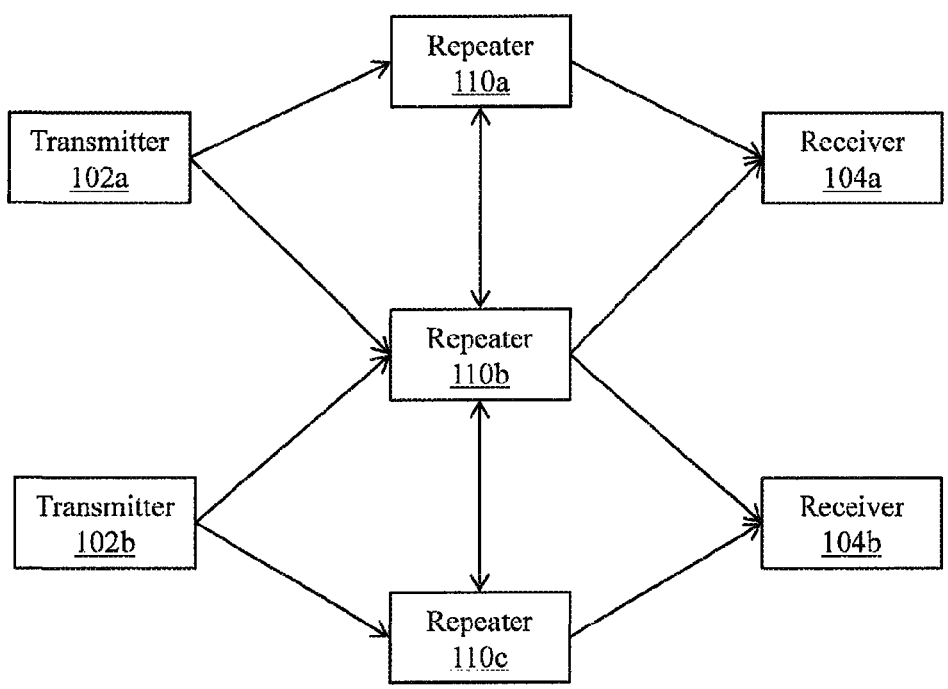
FIG. 2 is an illustrative environment for implementing the steps in accordance with an example embodiment of the invention.

FIG. 2 depicts an exemplary example implementation of a redundant low-powered network of the present invention. In particular, FIG. 2 depicts how the various devices can communicate with one another over different pathways using the communication protocol to deliver a data transmission from a source to a destination. Initially, transmitter devices 102a and 102b transmit data packets to all repeater devices 110 and receiver device 104 within range of their respective communication mediums. For example, transmitter device 102a can be communicating wirelessly (e.g., using BLE, Wi-Fi®, etc.) where only repeater devices 110a and 110b are within range. Similarly, transmitter device 102b can communicate over a combination of wireless and wired communications to repeater devices 110b and 110c. Repeater devices 110a, 110b, and 110c are each configured to receive the data transmissions from the transmitter devices 102a and 102b. Following the steps, as discussed with respect to FIGS. 1A and 1B and FIGS. 3, 4, and 5 below, the repeater devices 110a, 110b, and 110c can each broadcast the received transmissions to the other repeater devices 110 and the receiver devices 104 within range of their respective communication means. In particular, the data transmissions are received by one of the other repeater devices 110 and are rebroadcast to available devices capable of receiving within range. As would be appreciated by one skilled in the art, the repeater devices 110 can also de-duplicate data transmissions when appropriate, as discussed with respect to FIGS. 1A and 1B and FIGS. 3, 4, and 5 below.

In accordance with an example embodiment, the repeater devices 110 can selectively rebroadcast data transmissions by duplicating the data transmission to increase transmission viability. As shown in FIG. 2, if one or more of the devices between a source (transmitter device 102) and a destination (e.g., receiver device 110) fails, then the redundancy of the network and the redundant broadcasts for a given data transmission, then the data transmission can still reach the appropriate destination. For example, if transmitter device 102b sends a data transmission intended for receiver device 104a, and repeater device 110c has gone offline (e.g., powered off, due to failure, etc.), then the data transmission can still reach receiver device 104a through repeater device 110b.

Once data transmissions are received by the receiver devices 104a and 104b the data transmissions can be analyzed to determine if they are duplicated or addressed for a different destination receiver device 104. Based on the determination, the data from the data transmissions are either saved or rejected. For example, the receiver device 104b has already received a particular data transmission from transmitter device 102a (e.g., a duplicate transmission of the same unique payload), so the data packet is ignored and discarded. Each of the devices (e.g., repeater devices 110 and receiver devices 104) can cache the data transmission and either, de-duplicate the data transmission by removing duplicate data transmissions (e.g., data transmissions including the same unique payload) or duplicate the transmission and broadcast the duplication(s).

Figure 3:
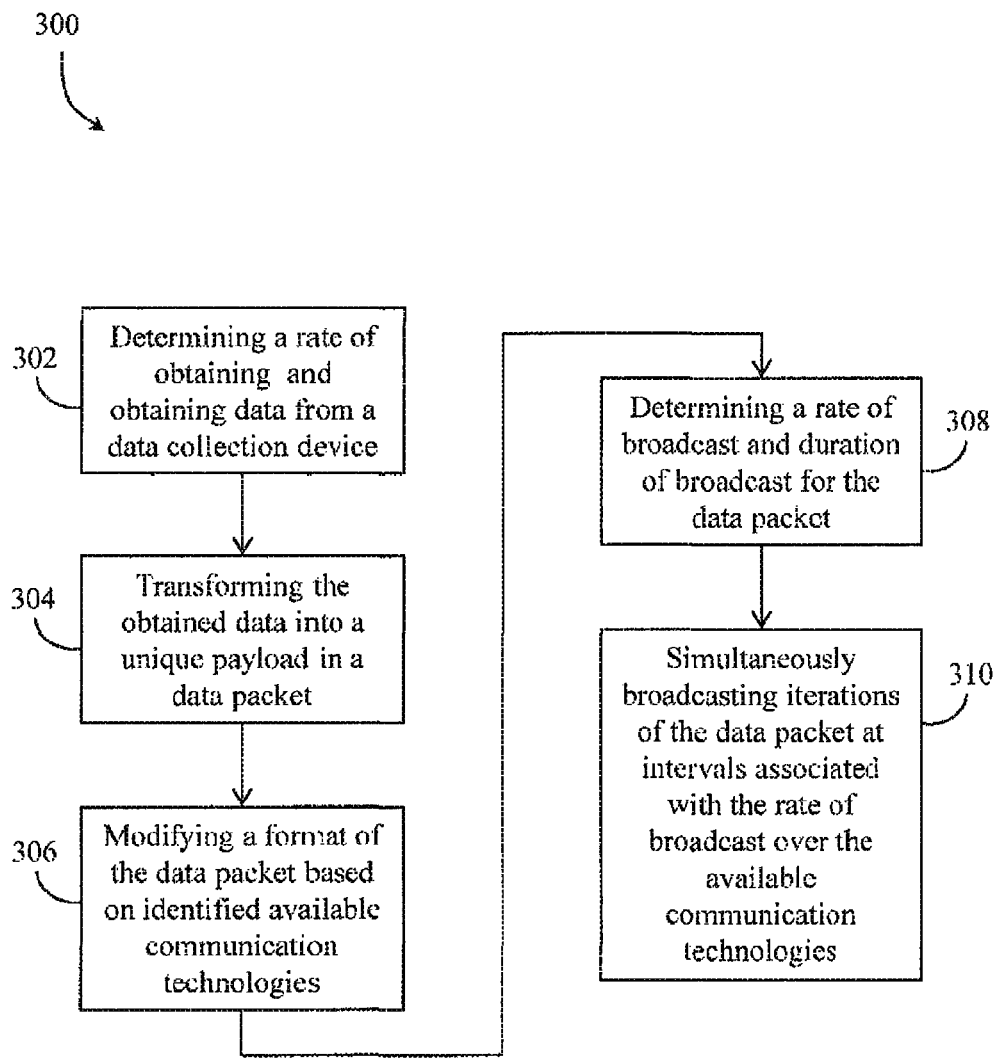
FIG. 3 is a flowchart depicting an example operation of a transmitter device utilizing the communications protocol.
Figure 4:
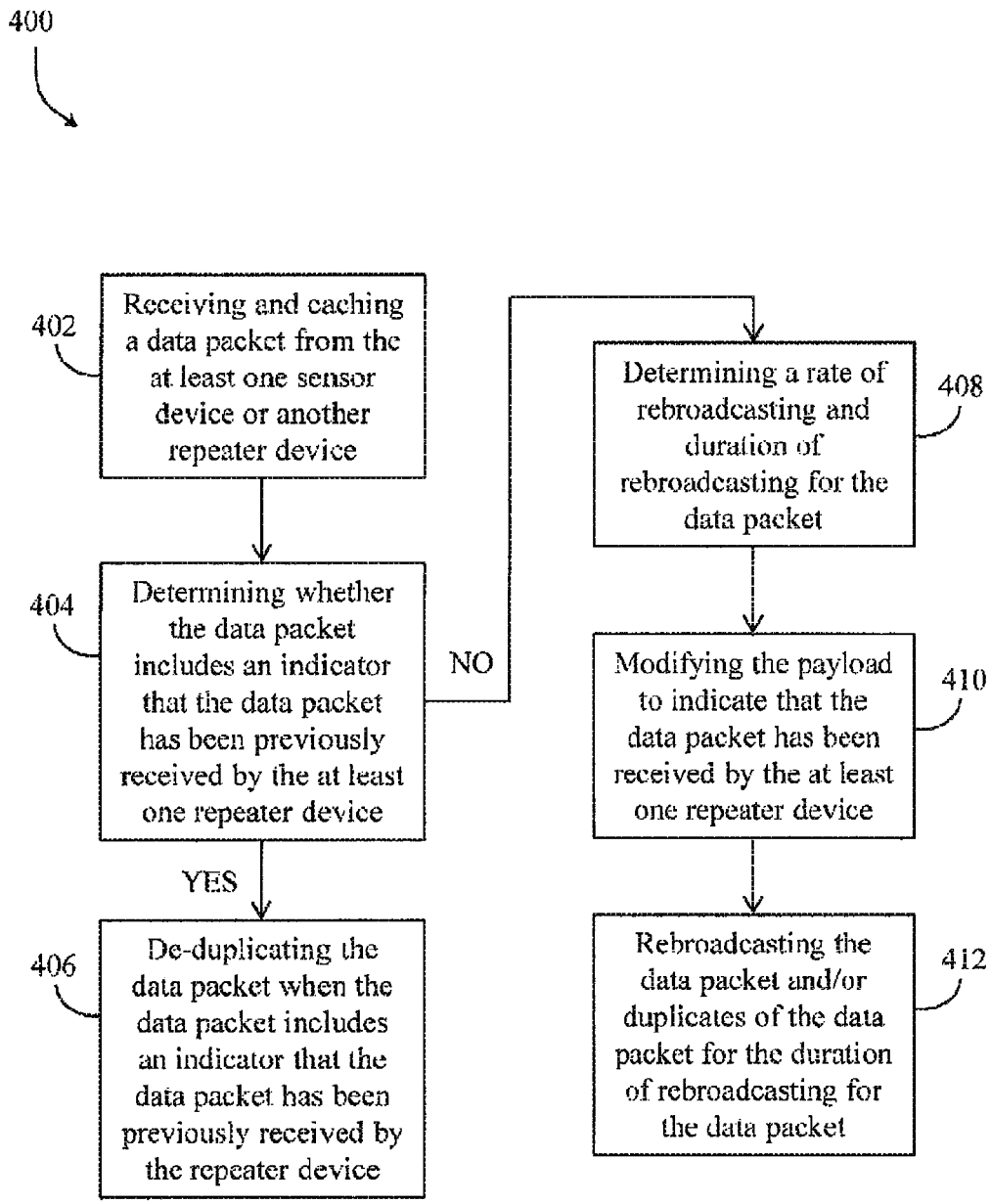
FIG. 4 is a flowchart depicting an example operation of a repeater device utilizing the communications protocol.
Figure 5:
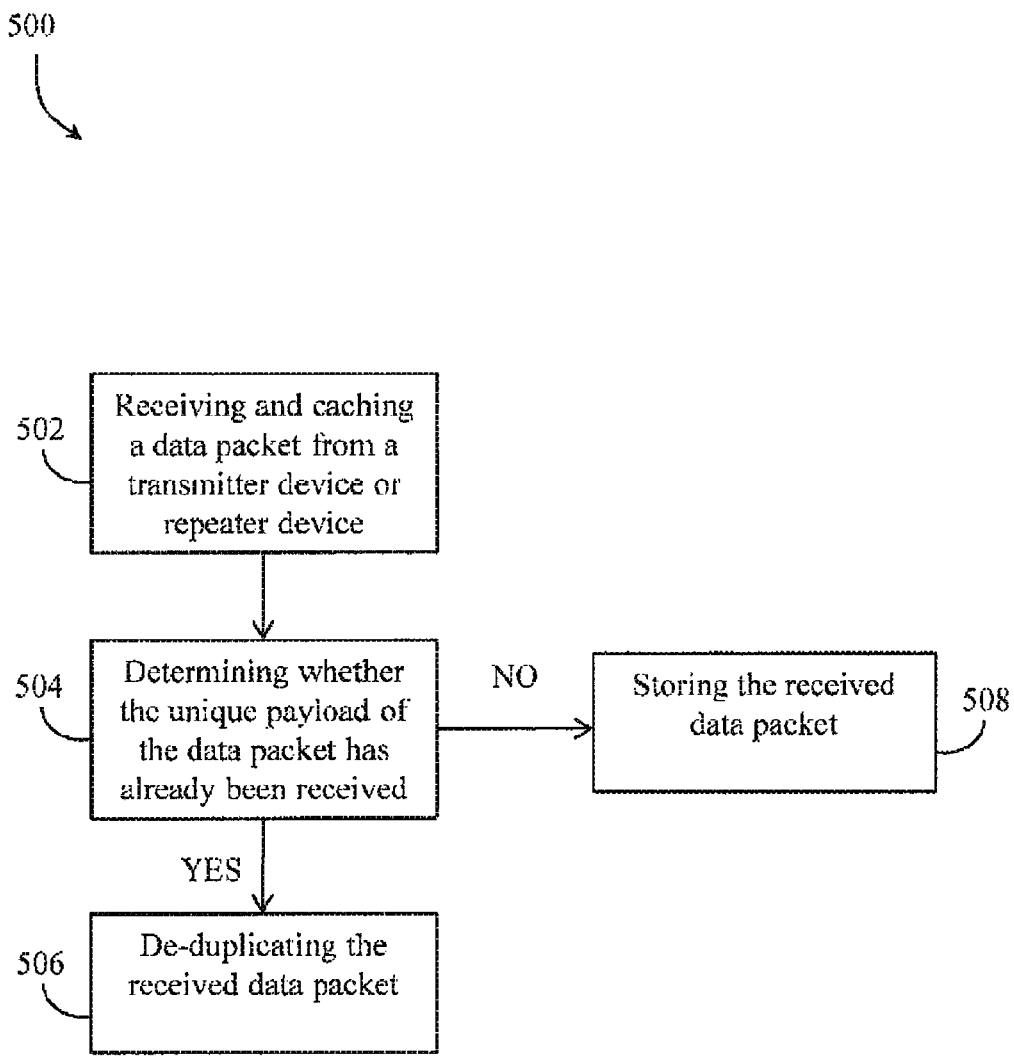
FIG. 5 is a flowchart depicting an example operation of a receiver device utilizing the communications protocol.

FIGS. 3, 4, and 5 depict exemplary flows for depicting the protocol in use by the devices in the communication system 100. FIG. 3 depicts a flowchart for an example process 300 of a transmitter device 102 utilizing the communications protocol of the communication system 100, in accordance with the claimed invention. In particular, the combination of the transmitter device 102 and the sensor 106 can be configured by the communication protocol to carry out the steps in process 300.

At step 302, the transmitter device 102 determines a rate of obtaining data from a data collection device (e.g., sensor 106). Based on the rate of obtaining data, the transmitter device 102 can obtain data from the data collection device at intervals associated with the rate of obtaining the data from the sensor 106. As would be appreciated by one skilled in the art, the transmitter device 102 can request data from the sensor 106 or the sensor 106 can periodically provide data to the transmitter device 102 proactively.

At step 304, the transmitter device 102 transforms the obtained data into a unique payload in a standardized data format following the rules defined in the communication protocol of the communication system 100. The transformation can include creating and formatting the payload to include all of the information required by the communication protocol. Thereafter, the payload is included in a data packet for transmission. As would be appreciated by one skilled in the art, the data packet can also be created and formatted according to the rules defined by the communication protocol. For example, depending on the communication mediums being utilized, a header and/or trailer for the data packet can be formatted by the transmitter device 102 according to the rules in the communication protocol.

At step 306, the transmitter device 102 identifies available communication technologies of a transmittertransmitter device. Once the available communication technologies are identified, the transmitter device 102 modifies a format of the data packet, based on the identified available communication technologies, to be capable over both transmission mediums. For example, if the transmitter device 102 includes a transmitter antenna capable of broadcasting over both BLE and Wi-Fi-TCP, then the transmitter device 102 can modify the packet for transmission over Wi-Fi-TCP to include a destination address.

At step 308, the transmitter device 102 determines a rate of broadcast and duration of broadcast for the data packet. As discussed with respect to FIGS. 1A and 1B, the rate of broadcast and duration of broadcast can be determined based on a number of factors. The communication protocol can define how often to broadcast each data packet and how many iterations or how long to broadcast that data packet at that interval. For example, the rate of broadcast can be a predetermined value, the rate can be a multiple of a frequency in which data is obtained from the sensor 106, or the rate can be based on anticipated data transmission degradation. Additionally, the rate of broadcast can be modified based on other factors. For example, the rate of broadcast can be adjusted based on the battery life of a transmitter device 102, such that the data packets are broadcast less frequently to conserve battery power for the transmitter device 102. Similarly, the transmitter devices 102 can modify a rate of transmission of the data packets based on the obtained data from the sensor 106. For example, if the obtained data from a sensor 106 in a refrigerator indicates a temperature above a desired threshold (e.g., a temperature greater than 41 degrees), then an error condition can be triggered that modifies the rate of transmission can be multiplied above the normal rate of transmission. As would be appreciated by one skilled in the art, modification to a rate of broadcast can be dictated by rules established in the communication protocol.

At step 310, the transmitter device 102 simultaneously broadcasts iterations of the data packet at intervals associated with the rate of broadcast over the available communication technologies until the duration of broadcast is satisfied. For example, if the transmitter device 102 is instructed to broadcast the data packet one hundred times for each time data is obtained from the sensor 106, then once the one-hundredth data packet for that data reading (e.g., obtained data) has been transmitted, the transmitter device 102 will stop broadcasting packet for that data reading. In accordance with an example embodiment of the present invention, the unique payload of the data packet can be updated at each iteration being transmitted with a unique ordered designator. For example, each time a data packet is broadcast for a unique data reading, the unique ordered designator can be updated to reflect which iteration of the data packet being transmitted (e.g., updated to reflect number 94 of the 100 transmissions). As would be appreciated by one skilled in the art, this unique ordered designator can be an incremental counter or an offset time from the time that the data reading was originally obtained.

FIG. 4 depicts a flowchart for an example process 400 of a repeater device 110 utilizing the communications protocol, in accordance with the claimed invention. In particular, the repeater devices 110 can be configured by the communication protocol to carry out the steps in process 400. At step 402, the repeater device 110 receives and caches a data packet from transmitter device 102 or another repeater device 110. As would be appreciated by one skilled in the art, the repeater device 110 can be configured to listen for advertisement broadcasts (e.g., BLE) from transmitter device 102 or can receive data packets directly addressed to the repeater device (e.g., Wi-Fi-TCP).

At step 404, the repeater device 110 determines whether the data packet includes an indicator that the data packet has been previously received by that particular repeater device 110. For example, the indicator can be a flag included in the payload of the data packet that indicates that the particular repeater device 110 has previously transmitted that unique payload. As would be appreciated by one skilled in the art, the indicator can be identified any number of ways known in the art, as discussed with respect to FIGS. 1A and 1B. If the repeater device 110 determines that there is an indicator present, then process 400 will advance to step 406 for de-duplication, if not the process 400 will advance directly to step 408 for preparation for rebroadcasting.

At step 406, when data packet includes an indicator that the data packet has been previously received by the repeater device 110, the repeater device 110 de-duplicates the data packet. De-duplicated data packets will not be rebroadcast by the repeater device 110 and are discarded. As would be appreciated by one skilled in the art, the data packet can be re-broadcast up to a predetermined number of times before being de-duplicated. For example, the repeater device 110 can rebroadcast the data packet until the indicator reflects that the repeater device 110 has rebroadcast the same data packet three times previously. In accordance with an optional example embodiment of the present invention, the repeater device 110 can be configured to rebroadcast all received data transmissions regardless if that repeater device 110 has previously broadcast that particular data packet, and thus the de-duplication of step 406 can be skipped and the process 400 can advance directly from step 402 to 408.

At step 408, the repeater device 110 determines a rate of rebroadcasting the data packet from the unique payload in the data packet. Similarly to determining the rate of broadcast, as discussed with respect to FIG. 3, the rate of rebroadcast and duration of the rebroadcast can be determined based on a number of factors. As would be appreciated by one skilled in the art, the rate of rebroadcasting by the repeater device 110 can be a different than a rate of broadcasting by the originating transmitter device 102. In accordance with an example embodiment of the present invention, the repeater device 110 can modify a rate of transmission of the data packets based on the obtained data included in the data packet. For example, if the obtained data in the data packet indicates that a temperature in the refrigerator is above a desired threshold (e.g., a temperature greater than 41 degrees), then an error condition can be triggered that modifies the rate of transmission can be multiplied above the normal rate of transmission. Similarly, the duplication or de-duplication of the data packets can also be modified based on the obtained data. As would be appreciated by one skilled in the art, modification to a rate of broadcast and duplication or de-duplication can be dictated by rules established in the communication protocol.

At step 410, the repeater device 110 modifies the payload to indicate that the data packet has been received by the repeater device 110. The indicator that the data packet has been received by the repeater device 110 can be used by a receiving device (e.g., another repeater device 110 or a receiver device 104) to identify a number of hops taken by the data transmission or can be used by the repeater device 110 itself if the data transmission is received again, as discussed with respect to steps 404 and 408.

At step 412, the repeater device 110 rebroadcasts the data packet and/or duplicates the data packet based on the determined rate of rebroadcasting the data packet from the previous steps. The data packet can be rebroadcast simultaneously over the available communication technologies until the duration of broadcast is satisfied, as discussed with respect to FIGS. 1A, 1B, and 3. In accordance with an example embodiment of the present invention, the repeater device 110 can bridge communication technologies and rebroadcast the data packet over other using different types of communication medium pathways from that of the received data packet, as discussed with respect to FIGS. 1A and 1B.

FIG. 5 depicts a flowchart for an example process 500 of a receiver device utilizing the communications protocol, in accordance with the claimed invention. In particular, the combination of the receiver device 104 and the data storage device 208 can be configured by the communication protocol to carry out the steps in process 500. At step 502, the receiver device 104 receives and caches a data packet from a transmitter device 102 directly or from a repeater device 110 rebroadcasting a data transmission from a source transmitter device 102. As would be appreciated by one skilled in the art, the receiver device 104 can be configured to listen for advertisement broadcasts (e.g., BLE) from transmitter device 102 or can receive data packets directly addressed to the repeater device (e.g., Wi-Fi-TCP).

At step 504, the receiver device 104 determines whether the unique payload of the data packet has already been received, as discussed with respect to FIGS. 1A, 1B, and 4. If the receiver device 104 determines that the unique payload has previously been received and stored, then the process 500 advances to step 506 for de-duplication. At step 506, the receiver device 104 de-duplicates the transmittable data packet. The receiver device 104 can de-duplicate a data packet by ignoring the data packet and removing the data packet from cache storage. If the receiver device 104 determines that the unique payload has not been previously received, then the process 500 advances to step 508 for storage.

At step 508, the receiver device 104 stores the received data packet for later retrieval. The storing can include transforming the data packet into readable data of the obtained data from the data collection device. For example, a temperature reading in the payload data can be decoded and transformed into a format for display to a user. In accordance with an example embodiment of the present invention, the receiver device 104 can be a gateway device bridging the low-powered network to another computing system and/or database storage system. For example, the receiver device 104 can be configured to receive data transmissions from the transmitter devices 102 and repeater devices 110 on a low-powered network and transfer the data transmissions to a cloud computing infrastructure over the internet.

Figure 6:
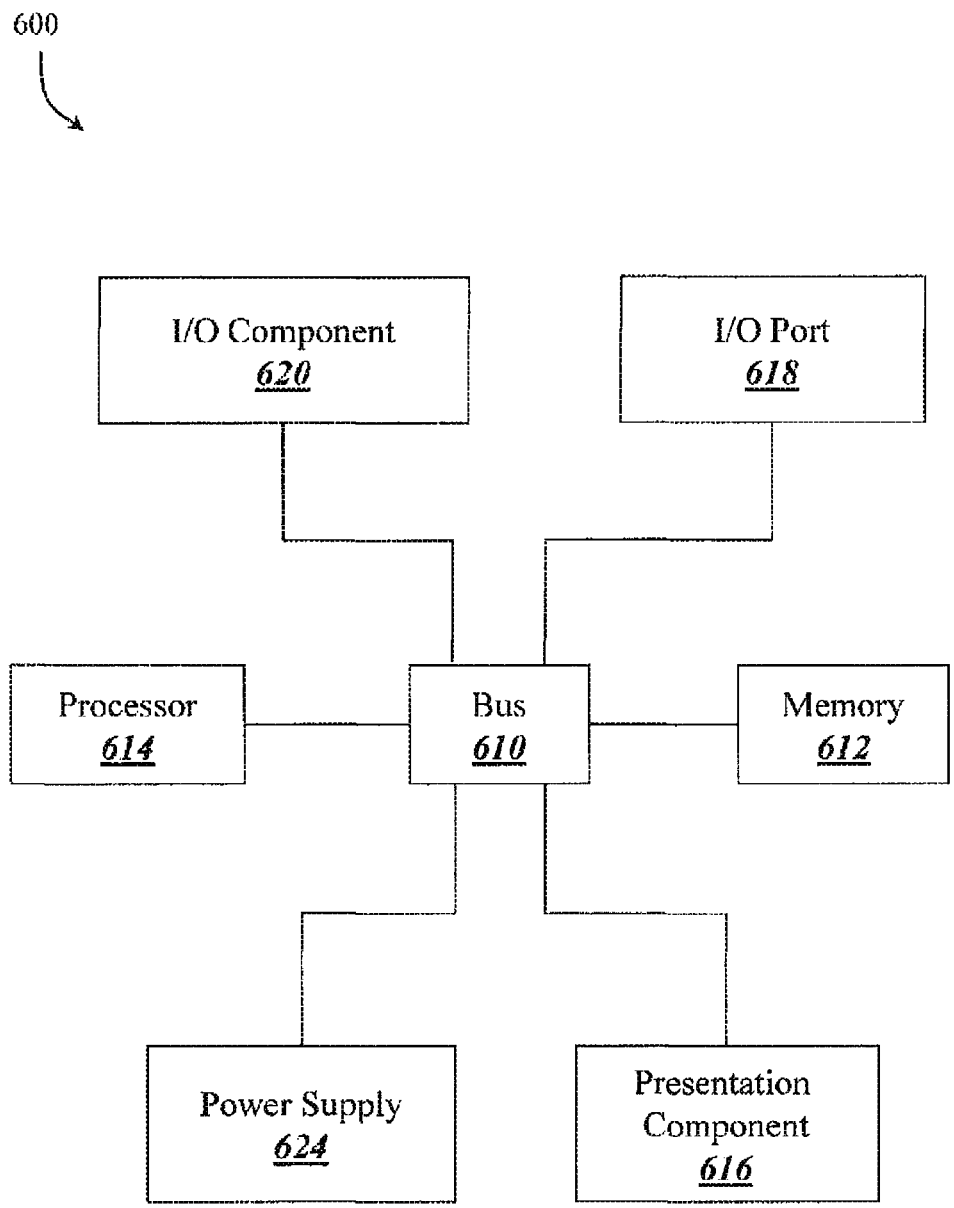
FIG. 6 is a diagrammatic illustration of a high-level architecture for implementing processes.

Any suitable computing device can be used to implement the computing devices 102, 104, 110 and methods/functionality described herein and be converted to a specific system for performing the operations and features described herein through modification of hardware, software, and firmware, in a manner significantly more than mere execution of software on a generic computing device, as would be appreciated by those of skill in the art. One illustrative example of such a computing device 600 is depicted in FIG. 6. The computing device 600 is merely an illustrative example of a suitable computing environment and in no way limits the scope of the present invention. A "computing device," as represented by FIG. 6, can include a "workstation," a "server," a "laptop," a "desktop," a "hand-held device," a "mobile device," a "tablet computer," or other computing devices, as would be understood by those of skill in the art. Given that the computing device 600 is depicted for illustrative purposes, embodiments of the present invention may utilize any number of computing devices 600 in any number of different ways to implement a single embodiment of the present invention. Accordingly, embodiments of the present invention are not limited to a single computing device 600, as would be appreciated by one with skill in the art, nor are they limited to a single type of implementation or configuration of the example computing device 600.

The computing device 600 can include a bus 610 that can be coupled to one or more of the following illustrative components, directly or indirectly: a memory 612, one or more processors 614, one or more presentation components 616, input/output ports 618, input/output components 620, and a power supply 624. One of skill in the art will appreciate that the bus 610 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 6 is merely illustrative of an exemplary computing device that can be used to implement one or more embodiments of the present invention, and in no way limits the invention.

The computing device 600 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CD-ROM, digital versatile disks (DVD) or other optical or holographic media; magnetic cassettes, magnetic tape, magnetic disk storage or other magnetic storage devices that can be used to encode information and can be accessed by the computing device 600.

The memory 612 can include computer-storage media in the form of volatile and/or nonvolatile memory. The memory 612 may be removable, non-removable, or any combination thereof. Exemplary hardware devices are devices such as hard drives, solid-state memory, optical-disc drives, and the like. The computing device 600 can include one or more processors that read data from components such as the memory 612, the various I/O components 616, etc. Presentation component(s) 616 present data indications to a user or other device. Exemplary presentation components include a display device, speaker, printing component, vibrating component, etc.

The I/O ports 618 can enable the computing device 600 to be logically coupled to other devices, such as I/O components 620. Some of the I/O components 620 can be built into the computing device 600. Examples of such I/O components 620 include a microphone, joystick, recording device, game pad, satellite dish, scanner, printer, wireless device, networking device, and the like.

Figure 7:
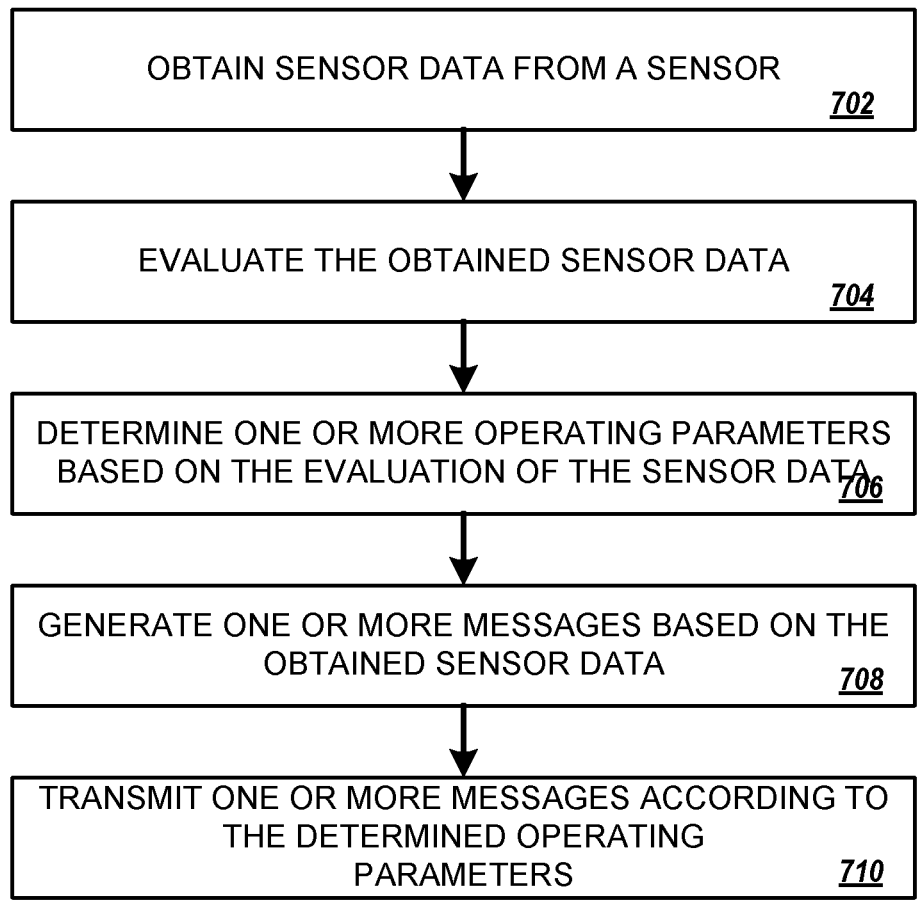
FIGS. 7 and 8 are flowcharts depicting examples of processes performed by a transmitter device.

FIG. 7 is a flow diagram that illustrates an example of a process 700 performed by a transmitter device. The transmitter device, such as the transmitter device 102 and/or the associated sensor 106, may change its behavior based on the sensor data that it obtains. For example, the transmitter device may have multiple operating modes that involve data collection and data transmission with different parameters. The transmitter device may analyze the sensor data received and switch between the operating modes when certain conditions are identified. This allows the transmitter device to operate in a low-power mode during normal operation, and then detect and respond to conditions that require a change in operation. This processing gives the transmitter device "edge intelligence," allowing it to detect infrequent edge cases and respond more appropriately in those situations. As an example, a transmitter device may include a temperature sensor and be configured to measure a temperature in a freezer every 10 minutes and broadcast the result. The transmitter device may be configured so that if the temperature reading is above an acceptable level, perhaps indicating a malfunction or an open freezer door, the temperature measurement is performed each minute. The message broadcast by the transmitter device can be adjusted, as well as the manner in which the message is transmitted. Other changes to the sensing and transmitting behavior of a transmitter device are discussed below.

In step 702, the transmitter device receives sensor data from a sensor. An example of a transmitter device is the transmitter device 102 of FIG. 1A, which obtains, evaluates, and transmits sensor data. The transmitter device may include any of the components discussed above for the transmitter device 102, including one or more processors, one or more storage devices, one or more wireless transmitters, one or more wired communication interfaces, one or more batteries, and so on. The sensor(s) 106 that the transmitter device receives data from may be included in or separate from the transmitter device. The transmitter device may include one or more sensors 106, which may be mounted on or in the transmitter device in some instances. In addition, or as an alternative, the transmitter device may communicate with one or more remote sensors 106 which provide data through a wired or wireless interface. Sensor data may be obtained passively, e.g., provided automatically or independently by a sensor 106, or may be obtained actively, e.g., in response to a request or other action initiated by the transmitter device to acquire a sensor reading.

In some implementations, the sensors measure a physical property of a sample, environment, or space. For example, the obtained sensor data may indicate a measurement of a temperature, a pH, a color, a density, a specific gravity, a humidity, or a level of total polar materials (TPM). The obtained sensor data may indicate a location, orientation, or movement of an item. As additional examples, the sensor(s) 106 may include an accelerometer, a gyroscope, a humidity sensor, a light sensor, a pressure sensor, a temperature sensor, and/or other types of sensors.

In step 704, the transmitter device evaluates the obtained sensor data. One or more data storage devices of the transmitter device may store rules, thresholds, or other data that assist the transmitter device to perform the evaluation. For example, the transmitter device may access data indicating a threshold or range for a measured property indicated by the sensor data. Various rules or other data stored by the transmitter device may indicate which processing should be performed by the transmitter device, as well as which actions or settings should be applied for the results of the evaluation. In some instances, the accessed data indicates that a value of a property within a threshold or range represents a first condition, e.g., a normal or desirable condition. A value of the property outside the threshold or range may indicate a second condition, e.g., an unusual reading or an error condition. Rule data stored by the transmitter device may indicate the different ways that the transmitter device should operate in response to detecting each of the various conditions.

As an example, a transmitter device configured to detect and provide temperature information for a freezer, and so may store data indicating a desired temperature within the freezer, e.g., at or below 0° F. As another example, a transmitter device for a deep fryer may store data indicating a desired temperature range of 375° F. to 400° F. Each transmitter device can compare the measured data to the corresponding thresholds or ranges do determine which conditions may be present. As discussed further below, the data stored by the transmitter device may indicate different operating modes or sets of operating parameters that should be used when different conditions are determined. For example, in the case of the transmitter device for a deep fryer, a first condition may be identified when the measured temperature is within the designated range, a second condition may be detected when the temperature is less than the range, and a third condition may be identified when the temperature is above the range. In some instances, other conditions may be identified, e.g., whether the detected temperature is above or below a reference value by at least a particular amount or percentage.

In some implementations, the transmitter device analyzes each sensor measurement individually, e.g., by comparing the current measurement to reference values for the measured property. In addition, or as an alternative, the transmitter device may evaluate multiple measurements obtained over a period. For example, the transmitter device may assess a sequence of measurements to identify a trend or outlier, or may assess the variability of a measured property over a period of time. In some instances, the transmitter device may determine whether a rate of change of a property or a maximum distance between highest and lowest measurements over a period satisfies a threshold. The data stored by the transmitter device can indicate various statistical measures and scores for the transmitter device to determine for each type of sensor data acquired, as well as reference values for comparison to determine whether relevant conditions have occurred.

In some implementations, certain steps of the evaluation process are conditional on the sensor data that has been obtained. For example, identifying certain values of a measured property may trigger the transmitter device to perform additional analysis specific to the condition identified. For example, if a temperature reading is determined to be within a desired range, the evaluation of the reading may terminate. However, if the temperature reading is determined to be outside the appropriate range, the transmitter device may perform additional processing to assess, e.g., how far out of the desired range the current measurement falls, whether the previous measurement was also outside the range, how long the value has been outside the range, how many measurements in a set or period of time were outside the range, and so on.

In step 706, the transmitter device determines one or more operating parameters based on the evaluation of the sensor data. The rules or other data stored by the transmitter device can provide a mapping between certain evaluation results and corresponding sets of operating parameters for the transmitter device. For example, rule data stored by the transmitter device can indicate a set of potential conditions that may be identified based on the evaluation, as well as a corresponding operating mode for the transmitter device in response to each condition.

The operating parameters can set or adjust various aspects of the operation of the transmitter device, such as the manner in which sensor data is collected and transmitted and the power saving techniques used. A transmitter device may be programmed operate in various different modes, and to dynamically select among the operating modes based on the evaluation of the sensor data. The changes may be based on evaluation of a single sensor reading, e.g., the most recently obtained sensor data, or a collection of sensor readings, e.g., a pattern or an average over a period. For example, the transmitter device may have a general operating mode in which sensor data is obtained at a particular rate that balances the need to conserve power with the need for a robust network. Other operating modes may have different operating parameters more appropriate for specific situations.

In some implementations, the transmitter device can determine data collection parameters that indicate the manner in which the transmitter device acquires sensor data. Examples include parameters that indicate how frequently the transmitter device acquires a measurement, what types of measurements are made, which sensors are used to acquire data, how many sensors are used to acquire data, and so on. If the transmitter device determines that a sensor measurement is outside a predetermined range, the rate that measurements are performed in the future can be increased. Similarly, if the variation in readings over time exceeds a threshold level, the rate of measurements can be increased to more accurately detect the variations. On the other hand, if sensor readings are consistently within a particular range, the rate of measurement may be decreased to conserve power. Certain conditions detected from the sensor data may trigger other changes to the measurement process. For example, if a temperature reading in a refrigerator is above a threshold, the transmitter device may begin to acquire data from other sensors to obtain more information about the situation. As a result, the temperature reading may trigger the transmitter device to acquire data from a humidity sensor or door sensor (e.g., a sensor indicating whether the door is open or closed) in addition to the temperature sensor.

In some implementations, the transmitter device can determine transmission parameters that indicate how messages indicating sensor measurements are transmitted by the transmitter device. Examples include parameters that indicate a number of messages to be transmitted, a rate or interval at which transmissions should occur, a frequency band for transmissions, a carrier frequency for transmissions, a transmission data rate, a transmission duration, a transmission length, a transmission power level, a transmission channel, a transmission protocol, or a transmission security setting. In some instances, when an important condition is detected, the transmitter device increases the number of messages that transmit the sensor reading. Rather than sending 5 messages that indicate the reading, the transmitter device may transmit 10 or 15 messages to increase the likelihood that the data reaches a receiver. As the frequency of sensor readings increases, the frequency of message broadcasts can also increase so that sets of multiple messages are transmitted for each of the readings. Similarly, the power level of transmissions can be increased, or the transmitter device may transmit over additional communications channels.

For example, a transmitter device may be configured to measure the temperature inside a refrigerator. In a default or general operating mode, the transmitter device may be configured to take a temperature measurement every 5 minutes, and for each measurement, to transmit 5 messages via BLE, each spaced apart by 30 seconds. These settings can balance the need to conserve power in a low-power, battery-operated transmitter device, with the need to monitor the refrigerator. When the temperature rises above a threshold level, however, the transmitter device may determine to decrease the measurement interval so that a measurement is taken every minute. Also, the transmitter device may determine to transmit 10 messages, over BLE and Wi-Fi, spaced apart by only 5 seconds. The new measurement and transmission parameters provide more detailed information about the measured property, e.g., the temperature of the refrigerator, while the information is most needed. Similarly, the increased transmission increases the likelihood that receivers will obtain the temperature information indicating the incorrect temperature condition. Once the temperature sensor indicates that the temperature has returned to the appropriate range, the transmitter device may determine to return to the previous, lower power setting to conserve power. This return to the low power mode may occur after a predetermined number of readings are in the appropriate range, or after the variation in readings is less than a maximum level, or another pre-preprogrammed condition is satisfied.

In step 708, the transmitter device generates one or more messages based on the obtained sensor data. As discussed above and further below, the transmitter device can generate a message payload that indicates one or more measurements from the sensor data. The message payload can be encrypted using a unique key, e.g., a key that is specific to the current set of sensor data and which is not re-used by the transmitter device. The encrypted data can include a key serial number or other identifier that assists an authorized receiver to generate the key and extract the encrypted data. The message payload may be included in a plurality of messages, each with a different designator, e.g., a message identifier, from an ordered sequence.

In some implementations, the content of the message varies depending on the evaluation of the sensor data. The format of the message, the metadata of the message, and the payload can each be generated based on the operating parameters determined by the transmitter device. For example, when certain conditions are detected, in addition to including data indicating the current measurement from the sensor data, the transmitter device may include additional information, such as a code, a score determined during the evaluation, a previous sensor measurement, or other data as indicated by the determined operating parameters.

In some implementations, the transmitter device partially or completely encrypts data indicating sensor measurements. In some implementations, the transmitter device may generate a message that includes two versions of a sensor reading. The full resolution measurement, such as a temperature reading of 74.6° F. may be encrypted so that unauthorized recipients cannot access the full-precision reading. The message may also include a second version of the measurement that is unencrypted, for example, a low-precision indication such as 70° F. The low-precision version can be obtained by rounding the full measured value, truncating information, or by assigning a code or flag. Any appropriate scheme can be used to assign a code corresponding to a value, such as assigning a code of "1" for a value from 0-20, a code of "2" for a value from 21-40, and so on. The coding scheme or set of flags used can vary based on the type of sensor that provided the measurement, the type of sensor data obtained, the item or space being measured, and so on. The low-precision measurement data may additionally or alternatively indicate a result of evaluating the sensor data, such as a value indicating whether or not a measured property is within a desired range or meets other criteria.

By transmitting measurement data in both encrypted and unencrypted forms, the encrypted full-precision form remains hidden, while a less-sensitive version of the data is accessible by other devices in the network. The other devices can use the unencrypted version to change their behavior, for example, to enhance or prioritize the transmission of messages that include sensor readings with above-average importance. The same evaluation process performed by a transmitter device to evaluate sensor data can be performed by a repeater device, for example. The repeater device can access the low-precision measurement data in a received message, and without needing the full-precision value the repeater device can evaluate the importance of the message based on the low-precision measurement data. The repeater device can then use the results of the evaluation to change its behavior. For example, the repeater device can use the evaluation to determine whether to de-duplicate or retransmit a message. Similarly, the repeater device can select a set of transmission parameters for a re-transmission, such as a transmission rate, a number of retransmissions, a transmission protocol or channel used, a transmission power, or any of the other transmission parameters discussed herein. In a similar manner, receiver devices can evaluate received messages based on the low-precision measurement data and determine a manner of storing the received message or providing alerts based on the evaluation.

In step 710, the transmitter device transmits the one or more messages according to the one or more operating parameters that were determined. The transmitter device may transmit the one or more messages using a wireless transmitter of the transmitter device, using a wired interface, or both. The determined operating parameters may specify various aspect of the transmission, such as a number of messages to transmit, an interval between the messages, a duration of the broadcast, a power level for the transmissions, which of the different communications protocols supported by the transmitter device should be used, and so on.

In some implementations, the transmitter device may be movable and reconfigurable. For example, a transmitter device may be removably mountable to a device or container, and may be configurable for different uses or to obtain and process data from different types of sensors. A transmitter device may be configured through a programming interface for operation in different scenarios. For example, during an initial set-up phase, a transmitter device can receive and store data indicating thresholds or other reference values, types of evaluation to perform, conditions to detect, and corresponding sets of operating parameters for the specific sample or space for which the transmitter device will be used. As a result, a single transmitter device may be programmed with a different set of control data depending on whether the transmitter device will be used with, for example, a refrigerator, a freezer, an oven, and so on. In some implementations, the transmitter device stores data corresponding to each of multiple different uses.

In some implementations, the transmitter device is configured to transmit messages indicating obtained sensor data according to a first set of transmission parameters when the sensor data satisfies at least one threshold. The transmitter device accesses data indicating (i) the at least one threshold and (ii) a second set of transmission parameters that are different from the first transmission parameters. To determine the set of operating parameters, the transmitter device may select a second set of transmission parameters for transmissions corresponding to the obtained sensor data based on the determination whether the obtained sensor data satisfies the at least one threshold. In some instances, the second set of transmission parameters specifies at least one of an increased data rate for transmissions, a decreased interval between transmissions, an increased power level of transmissions, or an increased number of communications channels or protocols for transmissions.

In some implementations, the transmitter device is operated to obtain sensor data from the sensor at a first rate. Then, based on the evaluation of the obtained sensor data, a new set of operating parameters are selected to cause the transmitter device to obtain sensor data from the sensor at a second rate that is different from the first rate.

As discussed above, the transmitter device can be a battery-powered device. After transmitting one or more messages corresponding to a first set of obtained sensor data, the transmitter device may place itself in a low-power state, e.g., in which the wireless transmitters of the transmitter device are inactive. The transmitter device may remain in this state until a time for obtaining a subsequent set of sensor data, according to a determined data collection rate. To save power, the transmitter device may remain in a transmit-only mode, without accepting or processing any received signals, during both the low-power state and the active state of transmitting messages.

Figure 8:
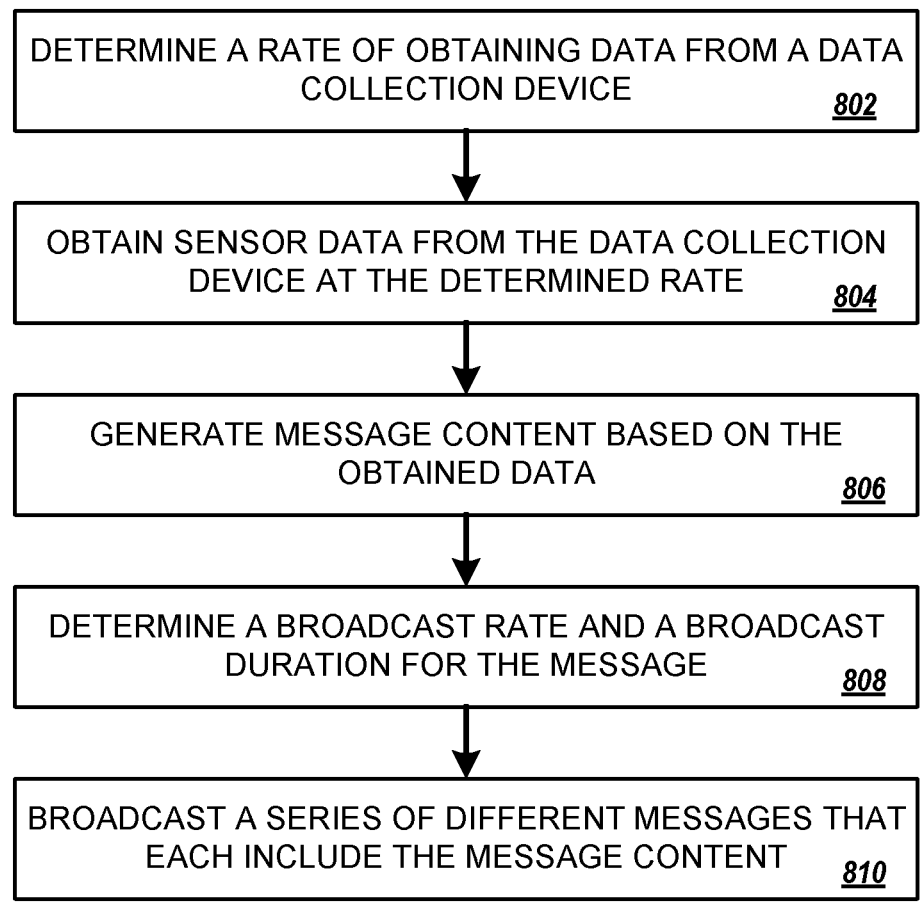

FIG. 8 is a flow diagram that illustrates a process 800 that can be performed by a transmitter device. In step 802, the transmitter device determines a rate of obtaining data from a data collection device, such as a sensor. The rate of obtaining data, e.g., a rate of obtaining a sensor measurement, can be determined based on a previous measurement value. For example, the transmitter device may enter a particular operating mode based on whether a previous measurement is within an appropriate range, as discussed above. The transmitter device can store data indicating the appropriate rate for data collection given the physical property and/or sample or space that the sensor is arranged to measure.

In step 804, the transmitter device obtains sensor data from the data collection device at the determined rate. The data can be collected passively or actively, and may be obtained from any of one or more sensors in communication with the transmitter device. As just a few examples, the obtained sensor data may indicate a measurement of a temperature, a pH, a color, a density, a specific gravity, a humidity, or a level of total polar materials (TPM).

In step 806, the transmitter device generates message content based on the obtained sensor data. The message content indicates a measurement indicated by the sensor data. In some implementations, the message content is a payload for a data packet. The message content may be generated using a key that is unique to the current set of sensor data, and is not used again by the transmitter device. For example, the transmitter device can encrypt the sensor data using a unique key that is specific to the current set of obtained data from the data collection device. The message content can also include data identifying (i) the unique key and (ii) an identifier for transmitter device. These additional data items can assist a receiver having an appropriate secret key to derive the unique key that was used to generate the encrypted message content. As a result of this process, when the transmitter device obtains multiple sets of sensor data at different times, each set of sensor data is encrypted with a different key.

In step 808, the transmitter device determines a broadcast rate and a broadcast duration for the message. As discussed above, the broadcast rate and broadcast duration can be selected based on the sensor data obtained from a sensor or other data collection device. As an alternative, the broadcast rate and a broadcast duration for the current mode of operation of the transmitter device can be selected.

In step 810, the transmitter device broadcasts a series of multiple different messages that each include the message content. The multiple different messages can be transmitted at intervals associated with the determined broadcast rate until an end of the determined broadcast duration. The multiple different messages include the same message content, e.g., indicating the same measurement from the same obtained sensor data. For instance, the message payload can be the same for each of the multiple messages, but metadata for each message can be different. In some implementations, each of the multiple messages is a data packet.

In some implementations, each of the multiple different messages includes original collected data, a timestamp for the original collected data, a timestamp for a broadcast of the message, and metadata identifying the data collection device.

Each of the multiple different messages can include a different designator. For example, the designators can be message identifiers in an ordered sequence. Each of the multiple different messages may indicate an offset time, such as an amount of time elapsed since a time that the obtained sensor data was originally obtained from the data collection device. This offset may be included as part of a message identifier or as a separate value. The offset can be the value of a time difference between when a packet was transmitted and when the original sensor reading was taken. Because the transmitter device is designed to send repetitive data, the offset can be provided to assist in managing the data at the receiver. Regardless of which of the multiple messages is received, a receiver can determine the time of the original sensor reading by subtracting the offset from the transmission time. The offset can be provided with the transmission time, e.g., a timestamp or other time indicator, or can be approximated as the receipt time at the receiver.

Various types of information can be included in each message from the transmitter device includes a manufacturer identifier for the manufacturer of the transmitter device, a media access control (MAC) address for the transmitter device, a sensor type identifier for the transmitter device and/or an associated sensor, a firmware version number, a battery voltage level for the transmitter device, a key sequence number indicating a key used to generate the message, an offset time (e.g., a number of seconds since a measurement was taken, and the data or message content that indicates the current sensor reading.

The transmitter device can be configured to obtain data from the data collection device at a first interval, and then broadcast the multiple different messages at an interval that is less than the first interval for obtaining data from the data collection device. For example, the transmitter device may be configured to obtain data every 5 minutes, but transmit the multiple messages corresponding to that data spaced apart by 15 seconds. The delay between messages is greater than is required by the communication protocol, to provide temporal diversity that provides robustness in the event of temporary interference or channel disturbances. The transmission rate can be selected so that each of the transmissions for a particular set of sensor data are completed before the next set of sensor data is obtained. As an alternative, in some instances, a broadcast duration may extend past the time of the next sensor measurement, so that one or more messages for a prior sensor measurement are interleaved with messages for a later-obtained sensor measurement.

When generating and transmitting the messages, the transmitter device can identify a communication technology supported by the transmitter device, and format each of the multiple different messages for transmission using the identified communication technology. The transmitter device can support multiple communications technologies, using different protocols and/or physical communications channels. Broadcasting the multiple different messages may include broadcasting the multiple different messages using multiple different wireless communication protocols. For example, multiple different protocols (e.g., Bluetooth, Wi-Fi, etc.) may be used, and multiple different frequencies, bands, or encodings may be used. Multiple wireless transmission protocols may be used concurrently during the broadcast duration. For example, during the period from the first message in a series to the last message in the series, message may be sent over multiple wireless protocols, or over a wired communication channel and one or more wireless communications channels.

In some implementations, the transmitter device places itself in a low-power mode when not acquiring sensor data or transmitting messages indicating the sensor data. The transmitter device then self-activates when a time for acquiring new sensor data occurs. The transmitter device acquires the sensor data, and broadcasts messages for a predetermined period of time, and then returns to the low-power mode.

The transmitter device can encrypt the sensor data that is transmitted using a derived unique key per transaction (DUKPT) key management scheme. In this scheme, each sensor reading can be encrypted by the transmitter device using a unique key. A key sequence number (KSN) corresponding to the unique key is also provided, allowing a receiver to obtain the key needed to decrypt the message. In general, multiple different messages in a broadcast for the same sensor reading have the same data payload, and thus include the same set of encrypted data.

In further detail, the key management scheme can be based on a base derivation key that is known to receivers but kept secret. For each transmitter device in a network, a unique initial PIN encryption key (IPEK) is derived from the base derivation key. Each transmitter device stores its own IPEK and uses it to create a set of transaction keys that can be used for individual transactions. The generation of the transaction keys can be done in a repeatable manner, so that a receiver would be able to generate the same list of transaction keys. In some implementations, the IPEK is discarded after this set of transaction keys is generated.

As new sensor readings are obtained, the transmitter device increments through the set of transaction keys. For example, the transmitter device may encrypt a sensor reading with the next transaction key in the list, then invalidate the transaction key so it not used for any subsequent sets of sensor data. The sensor data also generates a key sequence number or key serial number corresponding to the encrypted sensor reading. The key sequence number can indicate a transaction counter value, such as the index value in the list of transaction keys that corresponds to the current key. The key sequence number may also indicate, for example, a key set ID (e.g., indicating which of multiple base derivation keys was used) and an identifier for the transmitter device. Within a network multiple base derivation keys may be used, so that any exposure is limited in the event that a base derivation key is compromised.

A receiver may receive a message with encrypted data and the key sequence number. In some implementations, a receiver may decrypt received messages. In other implementations, a receiver 104 does not decrypt received messages, but causes them to be stored in a database or other data store for processing and analysis by another system. In this manner, the receiver 104 is not required to store the base derivation key and does not need to have the processing capability to perform the decryption. Later, a computing system can access databased of received messages and extract the encrypted measurement data. With the key sequence number, the computing system identifies the appropriate base derivation key, and uses it to re-generate the IPEK corresponding to the transmitter device that sent the message. Using a process similar to that of the transmitter device during initialization, the computing system can generate transaction keys using the IPEK and select the transaction key indicated by the transaction counter of the key sequence number. With the selected transaction key, the computing system can decrypt the encrypted data and extract the encoded sensor data.

Figure 9:
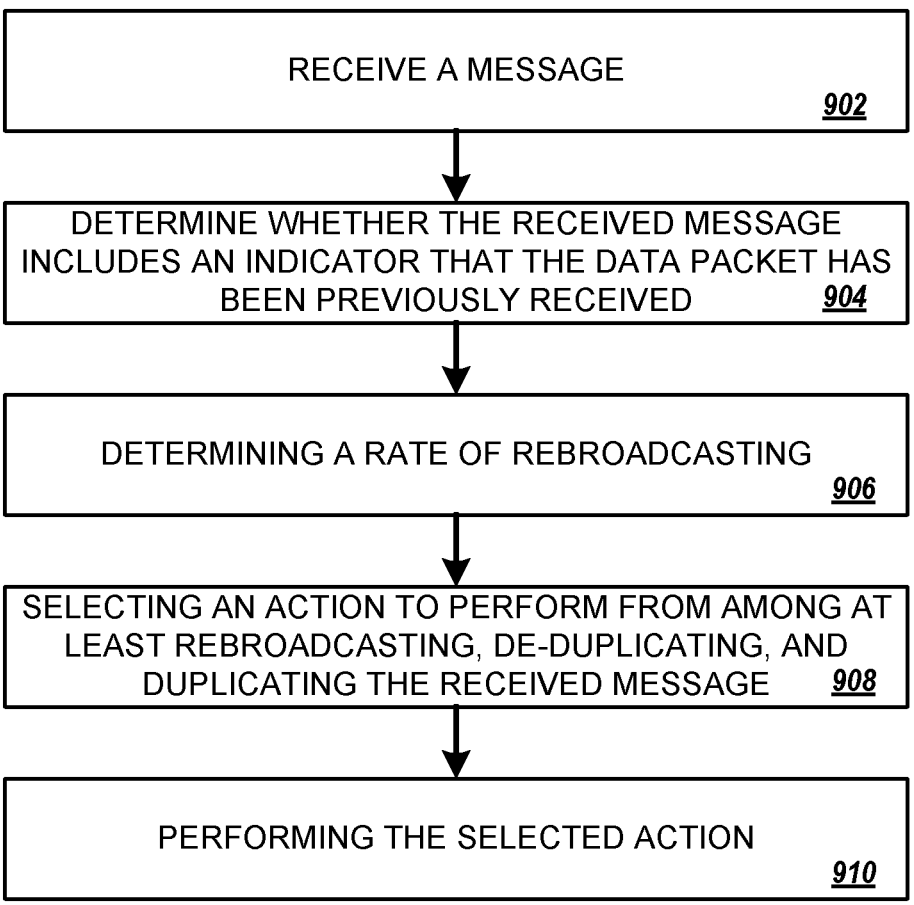
FIG. 9 is a flowchart depicting an example of a process performed by a repeater device.

FIG. 9 is a flow diagram that illustrates an example of a process 900 that can be performed by a repeater device. The repeater device can be part of a unidirectional ad hoc network, as discussed above, in which different devices operate independently and asynchronously relative to each other.

In step 902, the repeater device receives a message from a transmitter device or another repeater device. In step 904, the repeater device determines whether the received message includes an indicator that the data packet has been previously received by the repeater device or another repeater device. For example messages can include a counter value or code that indicates whether the message has previously been re-transmitted by a repeater. In some implementations, messages can include a counter value indicating a number of hops or rebroadcasts that have occurred. Each repeater device can increment the counter before retransmitting the message. If the counter exceeds a threshold, the repeater can determine to not transmit the message, to avoid cycles within the network. For example, the repeater device can extracting, from the received message, a value indicating a number of hops between devices that the received message has travelled. The repeater device then determines whether the value indicating the number of re-transmissions satisfies a predetermined threshold.

In step 906, the repeater device determines a rate of rebroadcasting data in the received message. The rate of rebroadcasting can be selected to be greater than a rate of transmission of the transmitter device that originally transmitted the message. In some implementations, the repeater device may be connected to electrical power and may not be power constrained like a transmitter device. As a result, the repeater device can transmit more instances of a message than a transmitter device, and send the transmissions at a greater rate than the transmitter device.

In step 908, the repeater device selects an action to perform for the received message. The action can be selected based on (i) the determination whether the received message includes an indicator that the received message has been previously received by the repeater device or another repeater device and (ii) the determined rate of rebroadcasting the received message. The action can be selected from among at least the selected action comprises rebroadcasting the received message, de-duplicating the received message, or duplicating the received message.

When the repeater device determines that the received message includes an indicator that the data packet has been previously received by a repeater, the repeater device can selecting the action of de-duplicating the received message. In other words, because the message has previously rebroadcast, the repeater may determine that further rebroadcasting is not needed and the repeater device can de-duplicate the message to not re-transmit the received message further.

When the repeater device determines that the received message does not include an indicator that the data packet has been previously received by the repeater device or another repeater device, the repeater can select to rebroadcast or duplicate the received message.

In step 910, the repeater device performs the selected action for the received message. When rebroadcasting a message, the repeater device can rebroadcast the received message using different intervals between multiple transmissions of the algorithms to increase transmission viability. The different intervals can be intervals determined according to an exponential backoff.

As discussed above, the repeater device may evaluate at least a portion of the sensor data in a received message, and then select an action to perform and/or determine operating parameters based on the evaluation. For example, a message may include an encrypted form of a sensor measurement, and also include an unencrypted form of the same measurement. The unencrypted form may be a low-precision value that has been rounded, truncated, altered, or otherwise changed relative to the encrypted version. As another example, the unencrypted form may be a code, flag, or value that provides information about the measurement, such as an indication of a range the measurement falls within or an indication of whether the measurement meets one or more criteria.

The repeater device may also determine, from the received message, information about the transmitter device that sent the original message or a sensor that generated the measurement. For example, the repeater device may access device type data, a device serial number or other device identifier, or other information that identifies the specific transmitter device that generated the original message, or characteristics of the transmitter device. From the information about the transmitter device, the repeater device may access further data about the transmitter. For example, the repeater device may access data from local storage, or request and receive data from a server over a network, that indicates that property the sensor of the transmitter device is configured to measure or what item or space the transmitter device is associated with. The accessed data can also include rule data, reference values, or other criteria for assessing the measurement data sent by that transmitter device. For example, a repeater device may extract a device type code from a message, and determine from the device type code that the message was produced by a transmitter device configured to provide temperature data. As another example, the repeater device may extract a device identifier code from a message. From the device identifier to a server, the repeater device may determine that the particular transmitter device is arranged to measure the temperature in a freezer, and that the desired temperature is 0° F. or less. With this information, the repeater device can determine whether the unencrypted measurement likely represents proper operation of the freezer, and assign an appropriate level of importance accordingly.

As part of the evaluation of each message, the repeater device may assign an importance score or other measure of priority. Then, based on the score, the repeater device can determine the appropriate transmission parameters to use. Messages assigned a higher priority can be transmitted to increase likelihood of reception, e.g., with increased numbers of retransmission, increased frequency of transmissions, transmissions over additional communications channels, and so on.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about" and "approximately" are intended to cover variations that may existing in the upper and lower limits of the ranges of subjective or objective values, such as variations in properties, parameters, sizes, and dimensions. In one non-limiting example, the terms "about" and "approximately" mean at, or plus 10 percent or less, or minus 10 percent or less. In one non-limiting example, the terms "about" and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the invention have been described. Other embodiments are within the scope of the following claims. For example, the steps recited in the claims can be performed in a different order and still achieve desirable results.

What is claimed is:

1. A method comprising:
   obtaining, by a transmitter device, sensor data from a sensor, the sensor data indicating a measurement result for a measurement of a property sensed by the sensor;
   evaluating, by the transmitter device, the obtained sensor data;
   determining, by the transmitter device, operating parameters based on the evaluation of the sensor data, the operating parameters specifying:
      a number of messages to be transmitted to indicate the sensor data;
      content of the messages to be transmitted; and
      a transmission security setting for the messages to be transmitted;
   generating, by the transmitter device, one or more messages that each include (i) encrypted data including an encrypted form of a first value that quantifies the measurement result for the measurement of the property sensed by the sensor, and (ii) non-encrypted data including a non-encrypted value that quantifies the measurement result for the measurement of the property sensed by the sensor, wherein the non-encrypted value indicates the measurement result at a lower precision than the first value; and
   transmitting, by the transmitter device, the one or more messages according to the determined operating parameters using a wireless transmitter of the transmitter device, wherein the one or more messages comprise the specified number of messages, and wherein each of the one or more messages includes the specified content and is transmitted according to the transmission security setting.

2. The method of claim 1, wherein evaluating the obtained sensor data comprises:
   determining, by the transmitter device, at least one threshold; and
   determining, by the transmitter device, whether the obtained sensor data satisfies the at least one threshold.

3. The method of claim 2, wherein the transmitter device is configured to transmit messages indicating obtained sensor data according to a first set of operating parameters when the sensor data satisfies the at least one threshold;
   wherein the method comprises accessing data indicating (i) the at least one threshold and (ii) a second set of operating parameters that is different from the first set of operating parameters; and
   wherein determining the operating parameters comprises selecting the second set of operating parameters for transmissions corresponding to the obtained sensor data based on the determination whether the obtained sensor data satisfies the at least one threshold.

4. The method of claim 1, wherein the operating parameters indicate a transmission power level determined based on the evaluation of the sensor data,
   wherein transmitting the one or more messages comprises transmitting the one or more messages at the determined transmission power level.

5. The method of claim 1, further comprising changing a process of obtaining sensor data performed by the transmitter device based on the evaluation of the sensor data.

6. The method of claim 1, wherein determining the operating parameters comprises determining a set of operating parameters that specifies at least one of a frequency of obtaining sensor data from a sensor, a type of sensor data collected, a number of sensors from which sensor data is collected, or an identity of sensors from which sensor data is collected.

7. The method of claim 1, wherein the property sensed by the sensor is a temperature, a pH, a color, a density, a specific gravity, a humidity, or a level of total polar materials (TPM).

8. The method of claim 7, wherein the method further comprises identifying multiple communication technologies supported by the transmitter device;
   wherein determining the operating parameters comprises selecting one or more of the multiple communication technologies based on the evaluation of the obtained sensor data; and
   wherein transmitting the one or more messages comprises transmitting the one or more messages using the selected one or more of the multiple communication technologies.

9. The method of claim 1, wherein the transmitter device is configured to transmit a message corresponding to the obtained sensor data according to a first set of operating parameters when the property sensed by the sensor has a value within a range of values;
   wherein evaluating the obtained sensor data comprises determining, based on the obtained sensor data, that a value for the property sensed by the sensor is outside the range of values; and
   wherein determining the operating parameters comprises:
      based on determining that the value for the property sensed by the sensor is outside the range of values, determining a second set of operating parameters for the obtained sensor data, the second set of operating parameters being different from the first set of operating parameters,
      wherein, relative to the first set of operating parameters, the second set of operating parameters specifies at least one of an increased data rate for transmissions, a decreased interval between transmissions, an increased power level of transmissions, or an increased number of communications channels or protocols for transmissions.

10. The method of claim 1, further comprising:
    operating the transmitter device to obtain sensor data from the sensor at a first rate; and
    based on the evaluation of the obtained sensor data, operating the transmitter device to obtain sensor data from the sensor at a second rate that is different from the first rate.

11. The method of claim 1, further comprising:
    determining, by the transmitter device, a data collection rate for obtaining data from the sensor;
    obtaining, by the transmitter device, multiple sets of sensor data from the sensor at the determined data collection rate; and
    generating and transmitting, by the transmitter device, multiple messages for each of the multiple sets of sensor data.

12. The method of claim 1, wherein the operating parameters indicate a rate or interval for transmitting the one or more messages; and
    wherein transmitting the one or more messages comprises transmitting the one or more messages at the determined rate or interval.

13. The method of claim 1, wherein the operating parameters indicate a transmission channel or a transmission protocol for transmitting the one or more messages; and wherein transmitting the one or more messages comprises transmitting the one or more messages using the indicated transmission channel or transmission protocol.

14. The method of claim 1, wherein the transmitter device transmits messages using a first communication channel prior to evaluating the obtained sensor data;
wherein the operating parameters determined based on the evaluation of the sensor data specify that messages should be sent using a second communication channel in addition to the first communication channel; and
wherein transmitting the one or more messages comprises transmitting the one or more messages over the first communication channel and the second communication channel.

15. The method of claim 1, further comprising determining, based on the sensor data, a measurement value for a measurement of a property;
wherein the transmitter device has an identifier; and
wherein generating the one or more messages comprises generating multiple messages corresponding to the measurement, wherein each of the multiple messages corresponding to the measurement:
(i) includes the identifier of the transmitter device;
(ii) indicates the measurement value determined for the measurement; and
(iii) includes a different designator from an ordered sequence of designators.

16. A transmitter device comprising:
a transmitter;
one or more processors; and
one or more machine-readable storage devices storing instructions that, when executed by the one or more processors, cause the transmitter device to perform operations comprising:
transmitting one or more first messages that each indicate a measurement value for a first measurement of a physical property, the first measurement being made using a first sensor, the one or more first messages being generated and transmitted according to a first set of operating parameters;
obtaining sensor data from the first sensor, the sensor data indicating a second measurement value for a second measurement of the physical property using the first sensor;
evaluating the obtained sensor data;
based on the evaluation of the sensor data:
changing a process of obtaining sensor data performed by the transmitter device, wherein changing the process of obtaining sensor data comprises causing sensor data to be acquired from a second sensor; and
determining second operating parameters that are different from the first operating parameters, the second operating parameters specifying different message content or transmission characteristics than the first operating parameters;
generating one or more messages that each include (i) encrypted data including an encrypted form of the second measurement value for the second measurement of the physical property, and (ii) non-encrypted data including a non-encrypted value derived from the second measurement value for the second measurement of the physical property, wherein the non-encrypted value indicates the second measurement of the physical property at a lower precision than the second measurement value; and
transmitting the one or more messages according to the one or more second operating parameters using a wireless transmitter of the transmitter device.

17. The transmitter device of claim 16, wherein evaluating the obtained sensor data comprises:
determining at least one threshold; and
determining whether the obtained sensor data satisfies the at least one threshold.

18. The transmitter device of claim 17, wherein the transmitter device is configured to transmit messages indicating obtained sensor data according to a first set of operating parameters when the sensor data satisfies the at least one threshold;
wherein the operations comprise accessing data indicating (i) the at least one threshold and (ii) a second set of operating parameters that is different from the first set of operating parameters; and
wherein determining the one or more operating parameters comprises selecting the second set of operating parameters for transmissions corresponding to the obtained sensor data based on the determination whether the obtained sensor data satisfies the at least one threshold.

19. The transmitter device of claim 16, wherein the second sensor measures a different physical property than the first sensor.

20. The system of claim 16, wherein the non-encrypted value is a rounded or truncated version of the second measurement value.

21. One or more non-transitory machine-readable storage devices storing instructions that, when executed by one or more processors of a transmitter device, cause the transmitter device to perform operations comprising:
obtaining sensor data from a sensor to generate a collection of sensor readings;
evaluating the collection of sensor readings;
determining operating parameters for the transmitter device based on the evaluation of the collection of sensor readings, wherein the operating parameters include:
data collection parameters that specify a type of sensor data collected and specify sensors from which sensor data is to be collected; and
transmission parameters that specify a number of messages to be transmitted to indicate the sensor data;
generating one or more messages that each include (i) encrypted data including an encrypted form of first data indicating a sensor reading for a property sensed by the sensor, and (ii) non-encrypted data indicating the sensor reading for the property sensed by the sensor, wherein the non-encrypted data indicates the sensor reading at a lower precision than the first data;
transmitting the one or more messages according to the determined transmission parameters using a wireless transmitter of the transmitter device; and
changing a process of obtaining sensor data performed by the transmitter device to acquire data according to the determined data collection parameters.

22. The one or more non-transitory computer-readable media of claim 21, wherein the first data specifies a value for the sensor reading for the property, and wherein the unencrypted data indicates that the sensor reading is within a predetermined range of values.

* * * * *

UNITED STATES PATENT AND TRADEMARK OFFICE
CERTIFICATE OF CORRECTION

| | | |
|---|---|---|
| PATENT NO. | : 9,998,994 B2 | Page 1 of 1 |
| APPLICATION NO. | : 15/265611 | |
| DATED | : June 12, 2018 | |
| INVENTOR(S) | : Le Zhang and William K. Chen | |

It is certified that error appears in the above-identified patent and that said Letters Patent is hereby corrected as shown below:

On the Title Page

Item (*) (Notice), Line 3, after "0 days." delete "days.";

In the Claims

Column 34, Line 28, Claim 20, delete "system" and insert -- transmitter device --;

Column 34, Lines 61-62, Claim 22, delete "computer-readable media" and insert -- machine-readable storage devices --.

Signed and Sealed this
Fifth Day of May, 2020

Andrei Iancu
*Director of the United States Patent and Trademark Office*